United States Patent

Yano et al.

[11] Patent Number: 5,914,731
[45] Date of Patent: *Jun. 22, 1999

[54] DATA RECORDING USING RANDOMIZED VARIATIONS TO PREVENT VISUAL ARTIFACTS DUE TO NON-UNIFORMITIES IN A PRINTING APPARATUS

[75] Inventors: Kentaro Yano; Naoji Otsuka, both of Yokohama; Atsushi Arai; Kiichiro Takahashi, both of Kawasaki; Osamu Iwasaki, Tokyo; Daigoro Kanematsu, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/311,551

[22] Filed: Sep. 23, 1994

[30] Foreign Application Priority Data

Sep. 30, 1993 [JP] Japan .................................. 5-244736
Sep. 30, 1993 [JP] Japan .................................. 5-268088

[51] Int. Cl.⁶ ............................. B41J 29/38; B41J 2/205
[52] U.S. Cl. ................................................. 347/9; 347/15
[58] Field of Search .............................. 347/5, 9, 10, 11, 347/15, 43; 358/298, 466

[56] References Cited

U.S. PATENT DOCUMENTS

| | | | |
|---|---|---|---|
| 3,681,650 | 8/1972 | Koll | 315/30 |
| 4,084,259 | 4/1978 | Cahill et al. | 358/429 |
| 4,313,124 | 1/1982 | Hara | 347/57 |
| 4,345,262 | 8/1982 | Shirato | 347/10 |
| 4,449,150 | 5/1984 | Kato | 358/298 |
| 4,463,359 | 7/1984 | Ayata | 347/56 |
| 4,578,714 | 3/1986 | Sugiura et al. | 358/298 |
| 4,680,596 | 7/1987 | Logan | 347/15 |
| 4,860,026 | 8/1989 | Matsumoto et al. | 347/15 |
| 5,111,302 | 5/1992 | Chan et al. | 358/298 |
| 5,233,366 | 8/1993 | Stephany | 347/15 |

FOREIGN PATENT DOCUMENTS

| | | | |
|---|---|---|---|
| 0291300 | 11/1988 | European Pat. Off. | |
| 2497043 | 6/1982 | France. | |
| 5-169664 | 7/1993 | Japan | 347/11 |

OTHER PUBLICATIONS

Patent Abstracts of Japan, vol. 6, No. 61 (M-123) (939) Apr. 20, 1982 & JP-A-57 002 773 (Nippon Denshin Denwa Kosha) Jan. 8, 1982.

*Primary Examiner*—John E. Barlow, Jr.
*Assistant Examiner*—Craig A. Hallacher
*Attorney, Agent, or Firm*—Fitzpatrick, Cella, Harper & Scinto

[57] ABSTRACT

A column band pattern memory (10) stores six different column band patterns "SML, SLM, MSL, MLS, LSM, and LMS" obtained by re-arranging three different area modulation ranks (L, M, and S). A column band pattern generator (12) irregularly selects one of the column band patterns stored in the column band pattern memory (10) on the basis of a numerical value generated by a random number generator (11). The selected column band pattern is input to a dot area determination unit (13), and dot areas in units of columns are determined on the basis of the order of dot area modulation ranks (e.g., the order of S, M, and L) in the selected column band pattern. A pulse controller (14) performs pulse control to form dots in accordance with the dot areas determined by the dot area determination unit (13).

52 Claims, 35 Drawing Sheets

(DOT SIZE LARGE)

(DOT SIZE MEDIUM)

(DOT SIZE SMALL)

FIG. 10

| PATTERN NUMBER | AREA MODULATION ORDER |
|---|---|
| 1 | S  M  L |
| 2 | S  L  M |
| 3 | M  S  L |
| 4 | M  L  S |
| 5 | L  S  M |
| 6 | L  M  S |

FIG. 17

| GROUP NUMBER | GROUP PATTERN |
|---|---|
| 1 | 1 2 3 4 5 6 |
| 2 | 1 2 3 4 6 5 |
| ⟨ | |
| 720 | 6 5 4 3 2 1 |

DATA RECORDING USING RANDOMIZED VARIATIONS TO PREVENT VISUAL ARTIFACTS DUE TO NON-UNIFORMITIES IN A PRINTING APPARATUS

BACKGROUND OF THE INVENTION

The present invention relates to a recording apparatus for recording an image by drawing dots on a recording medium and, more particularly, to a recording apparatus which can achieve high image quality.

Recording apparatuses arranged in a printer, a copying machine, a facsimile apparatus, and the like record an image consisting of a dot pattern on a recording medium such as a paper sheet, a resin thin plate, or the like on the basis of input image information. Such recording apparatuses can be classified into a wire-dot system, a thermal transfer system, a thermal recording system, an ink-jet system, an electrophotography system, and the like depending on their recording methods. In recent years, of these systems, the thermal transfer system and the ink-jet system are used in many recording apparatuses since they can realize high resolution with low cost.

A recording apparatus of the above-mentioned sort forms dots (a to h) using a recording head 1 on which recording elements (A to H) having image forming portions, as shown in FIG. 33. This operation is repeated upon recording scanning (main scanning) of the recording head 1, and each of the recording elements further forms a plurality of dots ((1) to (5) in FIG. 33), thereby recording an image.

However, since the above-mentioned recording apparatus uses a plurality of recording elements, a variation in dot area, a variation in dot formation position, and the like occur depending on the recording elements. For this reason, upon recording of image information which requires uniform dot areas and a uniform dot arrangement, a stripe-shaped non-uniformity is generated. This phenomenon will be described below with reference to FIGS. 34 to 36.

FIG. 34 shows an ideal state of a recorded image obtained by recording dots with uniform areas at accurate positions on the basis of basic 50%-halftone image information. FIG. 35 shows a 50%-halftone recorded image obtained when the area of each of dots in a line c recorded by the recording element C is larger than a standard area, and the area of each of dots in a line f recorded by the recording element F is smaller than the standard area. The image constituted by such dots becomes darker near the line c, and also becomes lighter near the line f. Since this phenomenon continuously occurs, a stripe-shaped nonuniformity (banding) is generated in the recorded image.

A 50%-halftone recorded image shown in FIG. 36 has uniform dot areas recorded by all the recording elements (A to H). However, dots in a line b recorded by the recording element B and dots in a line d recorded by the recording element D are offset from the standard positions toward the line c. In this case, the interval between dots b and c and the interval between dots c and d become smaller than a normal interval (lines e to f), and these portions become darker. Also, since the interval between dots a and b and the interval between dots d and e become larger than the normal interval, these portions become lighter. For this reason, a stripe-shaped nonuniformity is generated in the recorded image.

The above-mentioned phenomenon occurs due to a slight structural variation in recording elements when a high resolution is to be attained, and it is difficult to eliminate this phenomenon by improvements in the manufacture. It is also very difficult to control a variation in recording elements caused by aging of the recording elements, and to keep all the recording elements in the same condition.

The stripe-shaped nonuniformity which deteriorates image quality is generated since "light" and "dark" image portions are continuously formed in a recorded image. For this reason, a control method (random dot (size) control) for forming dots using the recording elements while irregularly changing their dot areas, so as to eliminate the nonuniformity of an image as a whole, although individual dot sizes vary, has been proposed.

However, the method of forming dots while irregularly changing the dot areas suffers the following problems.

As the first problem, processing power required for a CPU of the recording apparatus undesirably increases. For example, in a serial printer for performing recording by scanning a carriage in units of lines, a recording head normally has nozzles more nozzles than are required for printing one line. For example, a 360-DPI recording head has more than 60 nozzles. If the ejection driving speed is 60 kHz, such a recording head performs 360,000 heats (ejection operations) per second. Therefore, in order to irregularly change dot areas, a random number must be generated at least 360,000 times per second, and heat pulses to be applied to the nozzles must be switched in correspondence with the random number values.

Furthermore, in order to satisfy the recent requirement for achieving a high recording speed, a serial printer which can record several lines per scan and a recording head which can be driven at a high-speed period have been developed. Therefore, the processing power of the CPU required in random number control further increases.

As the second problem, a problem associated with adverse effects on image quality is posed. When the dot size is randomly changed, generation of a regular nonuniformity (e.g., the above-mentioned white/black stripe-shaped nonuniformity), which is conspicuous to the human eyes as a pattern, can be eliminated. However, the entire image may become noisy depending on the pattern. Such a noisy image is formed depending on the modulation width upon modulation of random dot sizes, and is one of adverse effects of the random control.

SUMMARY OF THE INVENTION

The present invention has been made in consideration of the above-mentioned problems, and has as one aspect to provide a recording apparatus, which eliminates a regular change in recorded state caused by, e.g., a variation in recording elements by random dot control for randomly changing the driving state of the recording elements, and improves image quality of a recorded image, and a control method therefor.

It is another aspect of the present invention to provide a recording apparatus, which stores instruction data for instructing a switching order of the driving states of recording elements in random dot control, and irregularly selects the instruction data to determine an order of changing the driving states, so as to more reliably distribute a change in recorded state, and a control method therefor.

It is still another aspect of the present invention to provide a recording apparatus, which can reduce the load on a CPU upon execution of random dot control, and a control method therefor.

It is still another aspect of the present invention to provide a recording apparatus, which can prevent deterioration of image quality caused by random dots while reducing the load on a CPU upon execution of random dot control, and a control method therefor.

It is still another aspect of the present invention to provide a recording apparatus which stores information for designating a use order of a plurality of instruction data for instructing a switching order of driving states of recording elements, and can sequentially select instruction data to be used on the basis of the stored information, so as to reduce the load on a CPU associated with generation of random numbers upon selection of instruction data in random dot control, and a control method therefor.

It is still another aspect of the present invention to provide a recording apparatus which stores information for designating a selection order of driving states and information for executing the respective driving states, and can randomly switch the driving states by changing the driving states with reference to these pieces of information, so as to reduce the load on a CPU associated with random dot control, and a control method therefor.

It is still another aspect of the present invention to provide a recording apparatus which stores a plurality of different tables each for designating a selection order of driving states, and selectively and randomly uses these tables in random dot control so as to improve image quality, and a control method therefor.

It is still another aspect of the present invention to provide a recording apparatus which can set a standard driving state on the basis of a use state (e.g., a head temperature) of a recording head, can change a recorded state on the basis of the standard driving state, and perform random dot control and image formation which are stable against a change in use situation, and a control method therefor.

It is still another aspect of the present invention to provide a recording apparatus which can set a range of a change in driving state in random dot control, and can realize image recording which matches a user's favor, and a control method therefor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing the data format in a column band pattern storage unit;

FIG. 17 is a view showing the storage state of group pattern data in the second embodiment;

DETAILED DESCRIPTION OF THE PREFERRED EMBODIMENTS

The preferred embodiments of the present invention will be described hereinafter with reference to the accompanying drawings.

<First Embodiment>

In the first embodiment, an image is formed by irregularly changing dot areas in the recording scanning direction (to be referred to as a main scanning direction hereinafter), in which a plurality of dots are formed by an identical recording element, in units of dot groups (to be referred to as columns hereinafter) in a sub-scanning direction in which a plurality of recording elements are formed. Upon execution of such image formation, an image nonuniformity caused by variations in structures and arrangement of the recording elements can be made less conspicuous. This image forming method will be referred to as a random dot image forming method hereinafter. The structure of a recording head which adopts an ink-jet system using heat energy (to be simply referred to as an ink-jet system or ink-jet hereinafter) as a recording system of a recording apparatus of this embodiment, a dot area modulation method, and a random dot image forming method will be described below.

(Ink-jet Recording Apparatus)

Figure 1:
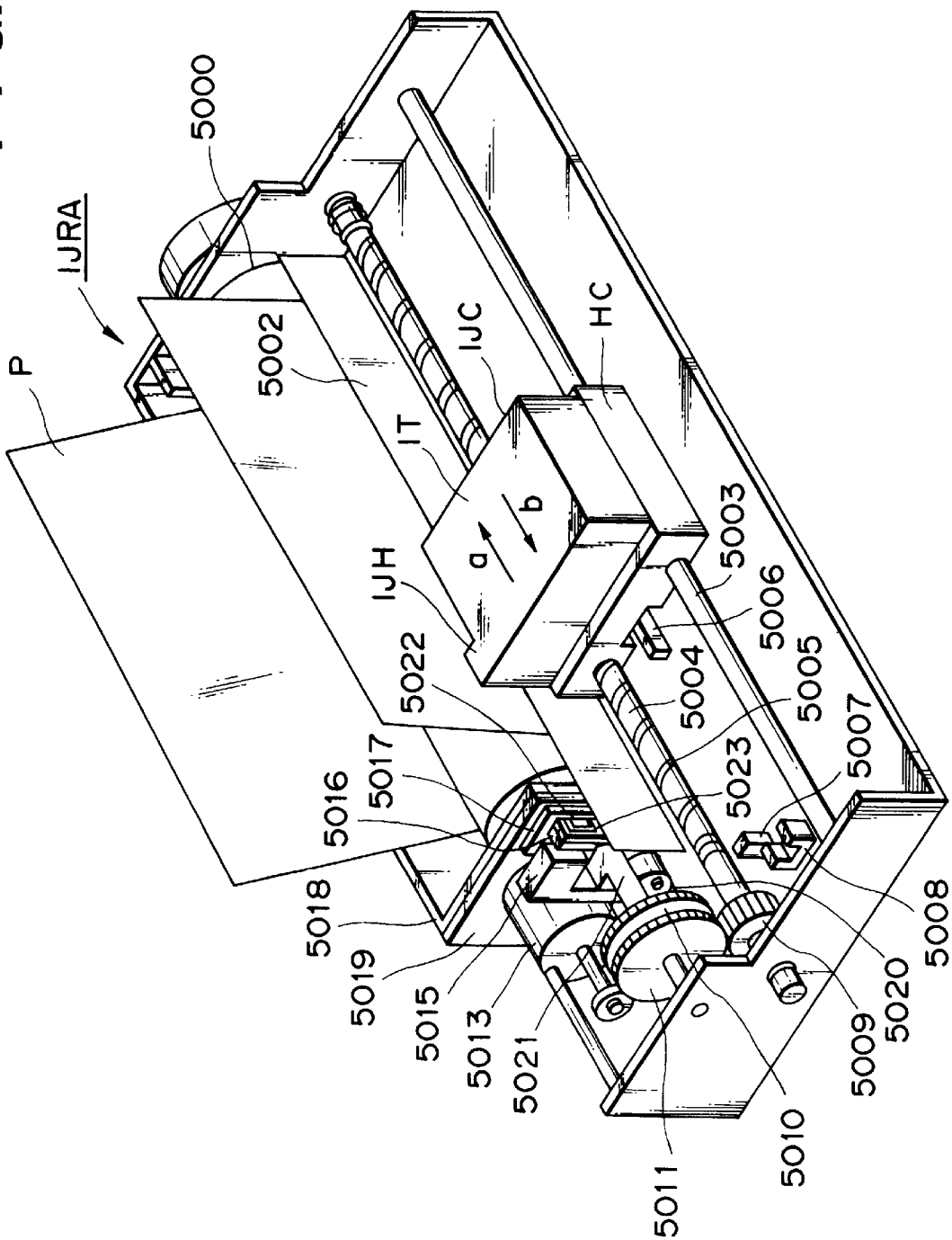
FIG. 1 is a schematic perspective view of an inkjet recording apparatus IJRA to which the present invention can be applied.

FIG. 1 is a schematic perspective view of an inkjet recording apparatus IJRA to which the present invention can be applied. Referring to FIG. 1, a lead screw 5005 is rotated via driving force transmission gears 5011 and 5009 in cooperation with the forward/reverse rotation of a driving motor 5013. A carriage HC, which is engaged with a spiral groove 5004 of the lead screw 5005, has a pin (not shown), and is reciprocally moved in the directions of arrows a and b. An ink-jet cartridge IJC is mounted on the carriage HC. Reference numeral 5002 denotes a sheet pressing plate, which presses a paper sheet against a platen 5000 across the moving direction of the carriage. Reference numerals 5007 and 5008 denote photocouplers, which constitute a home position detection means for confirming the presence of a lever 5006 of the carriage in the corresponding region, and, e.g., switching the rotational direction of the motor 5013. Reference numeral 5016 denotes a member for supporting a cap member 5022 for capping the front surface of the recording head; and 5015, a suction means for drawing the interior of the cap by suction. The suction means 5015 performs suction recovery of the recording head via an intra-cap opening 5023. Reference numeral 5017 denotes a cleaning blade; and 5019, a member for movably supporting the blade in the back-and-forth direction. These members are supported on a main body support plate 5018. The shape of the blade is not limited to the illustrated one, and a known cleaning blade can be applied to this embodiment, as a matter of course. Reference numeral 5012 denotes a lever for initiating the suction operation of the suction recovery operation. The lever 5012 moves upon movement of a cam 5020 engaged with the carriage, and its movement control is realized by a known transmission means such as clutch switching of the driving force from the driving motor.

These capping, cleaning, and suction recovery operations are executed at their corresponding positions upon operation of the lead screw 5005 when the carriage reaches a region at the side of the home position. However, the present invention is not limited to this as long as these operations are executed at known timings.

Figure 2:
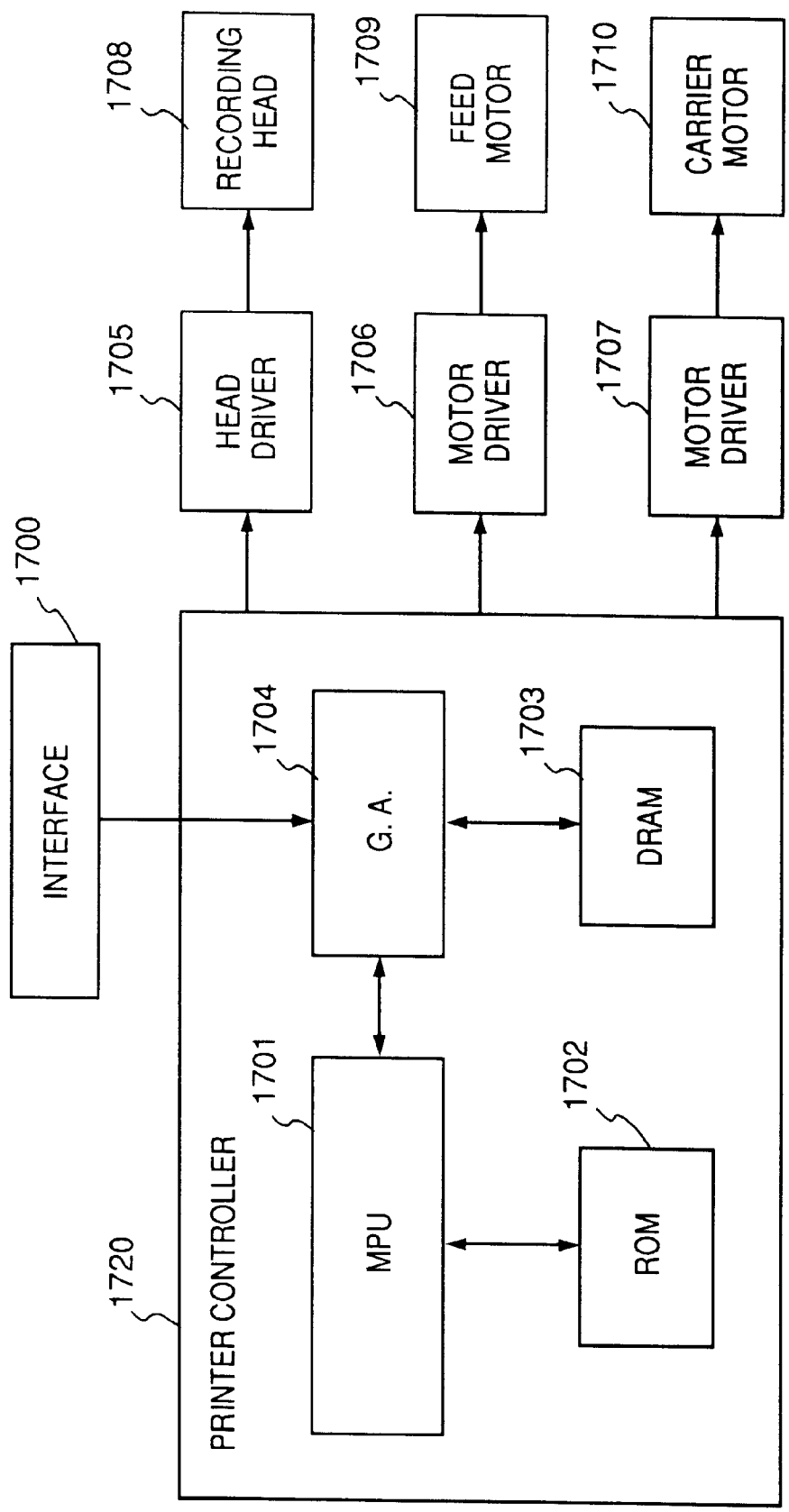
FIG. 2 is a block diagram showing the control arrangement for executing recording control of the recording apparatus IJRA.

The control arrangement for executing recording control of the above-mentioned apparatus will be described below with reference to the block diagram in FIG. 2. Referring to FIG. 2 showing a control circuit, reference numeral 1700 denotes an interface for inputting a recording signal; 1701, an MPU; 1702, a program ROM for storing control programs executed by the MPU 1701; and 1703, a dynamic RAM for storing various data (the recording signal, recording data to be supplied to the head, and the like). Reference numeral 1704 denotes a gate array for executing supply control of recording data to a recording head 1708, and also executing data transfer control among the interface 1700, the MPU 1701, and the RAM 1703. Reference numeral 1710 denotes a carrier motor for feeding the recording head 1708; and 1709, a feed motor for feeding a recording paper sheet. Reference numeral 1705 denotes a head driver for driving the head; and 1706 and 1707, motor drivers for respectively driving the feed motor 1709 and the carrier motor 1710. Note that reference numeral 1720 denote a printer controller.

The operation of the above-mentioned control arrangement will be described below. When a recording signal is input to the interface 1700, the recording signal is converted into recording data for printing between the gate array 1704 and the MPU 1701. Then, the motor drivers 1706 and 1707 are driven, and the recording head is driven in accordance with the recording data supplied to the head driver 1705, thus executing the printing operation.

(Ink-jet Recording Head)

The recording head 1708 constituting an ink-jet cartridge (IJC), i.e., an ink-jet recording head (IJU) will be described below with reference to FIG. 3. The ink-jet recording head IJU is a recording head of a type for performing recording using electro-thermal energy conversion elements for generating heat energy which causes film boiling of an ink in accordance with an electrical signal.

Figure 3:
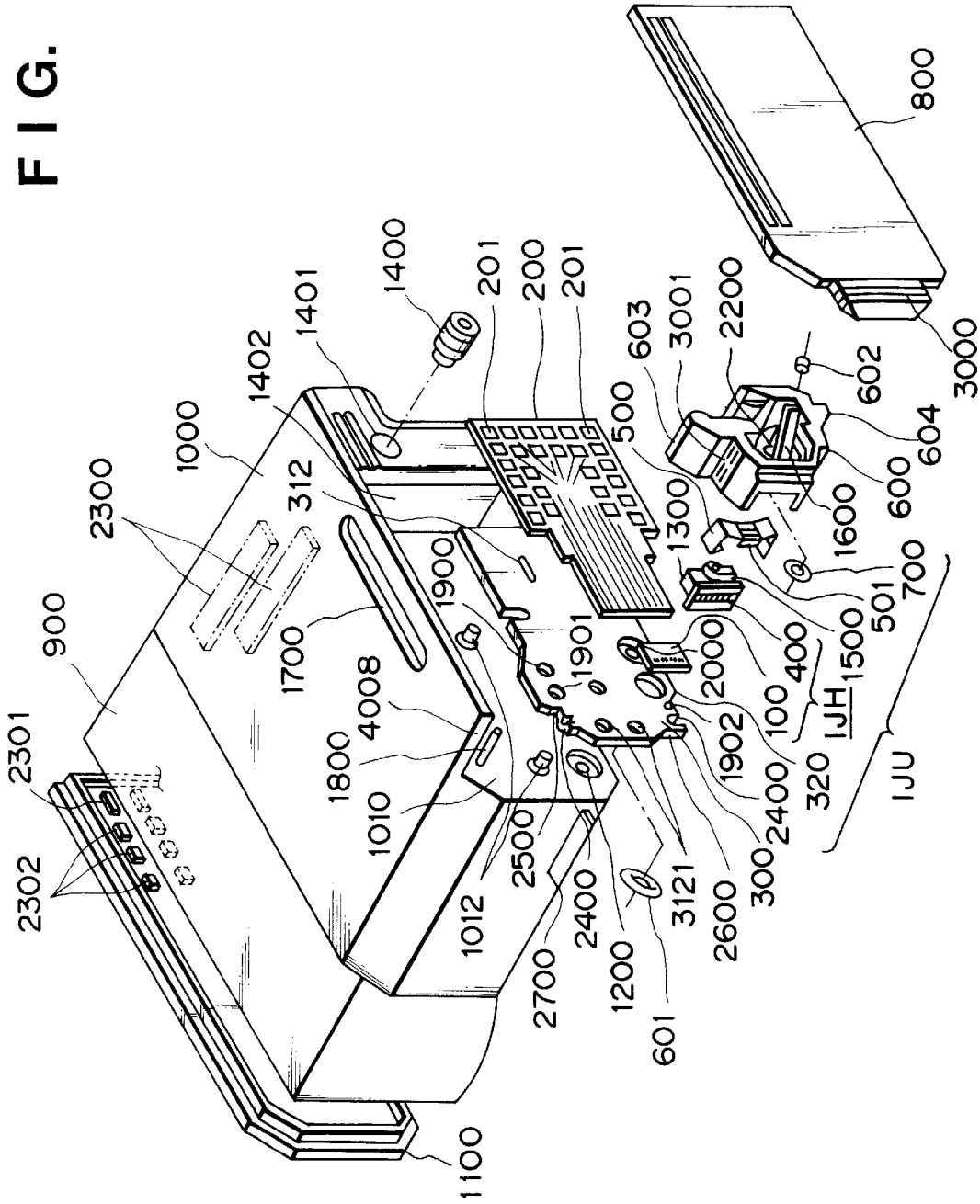
FIG. 3 is a perspective view for explaining the arrangement of an ink-jet recording head (IJU)

Referring to FIG. 3, reference numeral 100 denotes a heater board on which a plurality of arrays of electro-thermal energy conversion elements (ejection heaters) and electrical wiring lines of, e.g., Al (aluminum) for supplying electric power to these elements are formed by the film formation technique. Reference numeral 200 denotes a wiring board for the heater board 100, which has wiring lines corresponding to those on the heater board 100 (connected by, e.g., wire bonding), and pads 201 which are located at the end portions of the wiring lines and receive an electrical signal from a main body position.

Reference numeral 1300 denotes a grooved top plate which is provided with partition walls for dividing a plurality of ink channels, a common ink chamber, and the like. The top plate 1300 is obtained by integrally molding an ink reception port 1500 for receiving an ink supplied from an ink tank, and supplying the received ink to the common ink chamber, and an orifice plate 400 having a plurality of ejection orifices. As a material for integrally molding these members, polysulfone is preferable, but other molding resin materials may be used.

Reference numeral 300 denotes a support member, consisting of, e.g., a metal, for two-dimensionally supporting the back surface of the wiring board 200. The support member 300 serves as a bottom plate of the inkjet unit. Reference numeral 500 denotes a pressing spring having an M shape. The pressing spring 500 presses the common ink chamber by the central portion of the M shape, and presses some ink channels by its apron portion 501 with a line pressure. When the leg portions of the pressing spring are engaged with the back surface side of the support member 300 via holes 3121 of the support member 300 while sandwiching the heater board 100 and the top plate 1300 therebetween, the heater board 100 and the top plate 1300 are fixed in a press contact state by the biasing force of the pressing spring 500 and its apron portion 501.

The support member 300 also has a hole 320 through which an ink supply tube 2200 for allowing ink supply extends. The wiring board 200 is attached to the support member 300 by adhesion using, e.g., an adhesive. In an ink supply member 600 formed with parallel grooves 3001, an ink conduit 1600 contiguous with the above-mentioned ink supply tube 2200 is formed to have a cantilever shape which has a stationary portion at the side of the supply tube 2200, and a sealing pin 602 for assuring a capillary phenomenon between the stationary portion of the ink conduit and the ink supply tube 2200 is inserted. Since the ink supply member 600 is formed by molding, it is inexpensive and has high positional precision, thus eliminating a decrease in precision in the manufacture. In addition, since the ink supply member 600 has the cantilever-shaped conduit 1600, the press contact state of the conduit 1600 to the above-mentioned ink reception port 1500 can be stabilized even in mass production.

In this embodiment, a perfect communication state can be reliably obtained by only supplying a sealing adhesive from the ink supply member side in the press contact state. Note that the ink supply member 600 is easily fixed to the support member 300 by thermally welding projecting portions of pins (not shown) formed on the rear surface of the ink supply member 600, which pins project via holes 1901 and 1902 of the support member 300.

(Causes of Nozzle Nonuniformity)

Typical five causes of variations which results in a nonuniformity in a recording head in the above-mentioned recording head will be described below.

The first cause is a variation in resistance of ejection heaters. The variation in resistance directly leads to a variation in heating temperature upon driving of the ejection heaters. The variation in heating temperature brings about a variation in ejection energy, and also a variation in bubble length in an ink. The variation in bubble length results in variations in ejection amount and ejection speed. When the recording head which suffers these variations is used in image formation, the dot areas and dot shapes vary, resulting in a nonuniformity on a recorded image.

The second cause is a variation in surface state of heaters. On the heater surface, a small three-dimensional pattern is formed depending on a difference in contamination level by, e.g., foreign matter. The three-dimensional pattern causes a variation in bubble formation start timing in the early stage of bubble formation in the ink, i.e., a variation in bubble formation start time, thus varying the dot shapes, and the like.

The third cause is a variation in shape or size of the ejection orifices of the nozzles. A difference in shape of the nozzles causes a variation in ejection direction or amount, resulting in a nonuniformity on an image.

The fourth cause is variations in heater position and nozzle position. These variations result in an impedance difference between the ejection and non-ejection directions upon formation of a bubble. The impedance difference gives rise to a difference in conversion efficiency upon conversion of heat energy into ejection energy upon formation of a bubble, and causes differences in ejection amount and speed, thus causing a nonuniformity on an image.

The fifth cause is a durability variation. In the recording head, wettability between an ink and constituting members of the nozzles, and energy conversion efficiency change depending on the use frequency of the head. Such changes cause a difference in ejection characteristics in units of nozzles. More specifically, the dot sizes and landing positions vary over time between nozzles with high and low use frequencies, and these variations cause a nonuniformity on a recorded image.

It is very difficult to perform control or adjustment in the manufacture or use so as to suppress the above-mentioned typical causes of an image nonuniformity.

(Dot Area Modulation Method)

A method of modulating the size (area) of a dot formed on a recording medium will be explained below.

Figure 4:
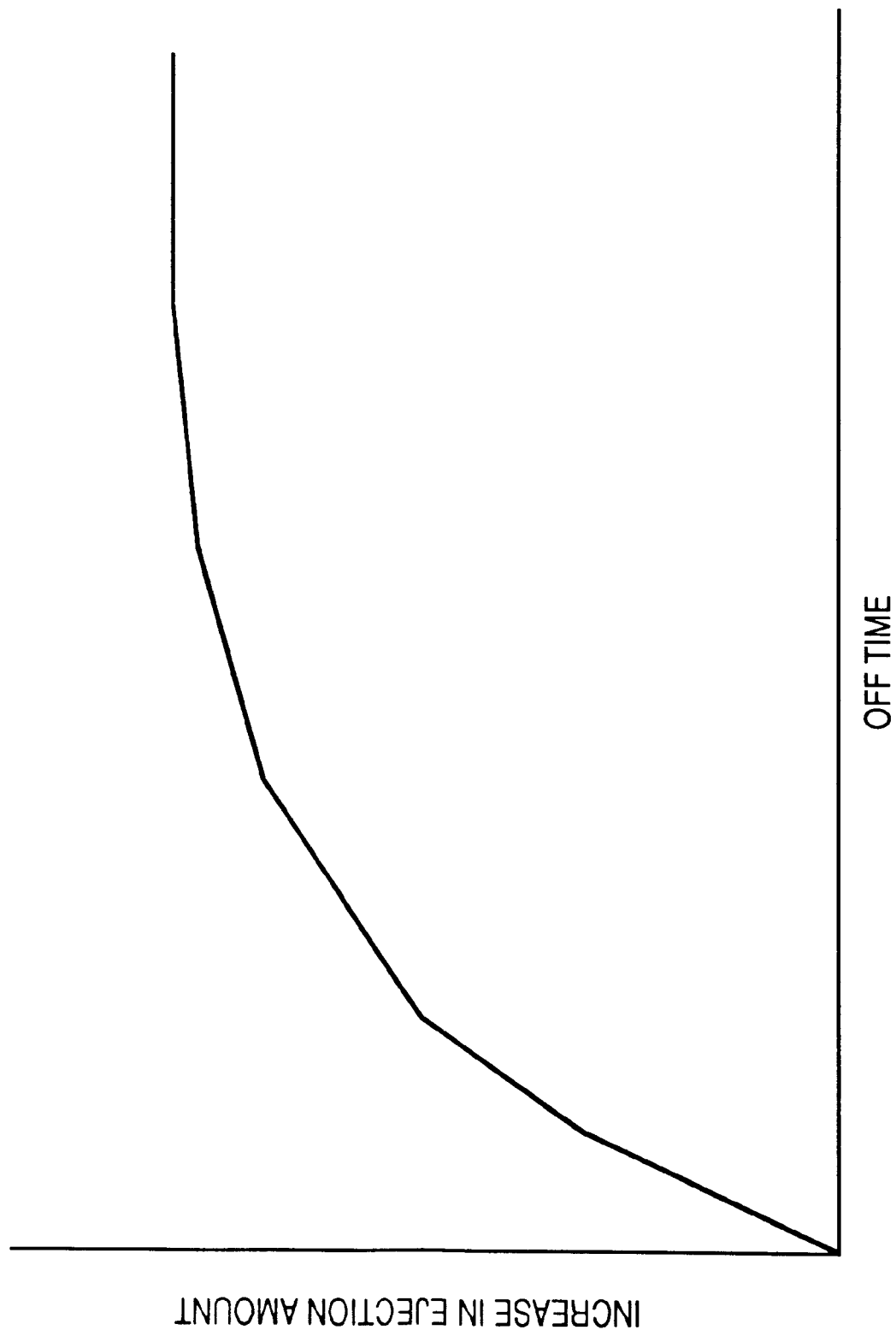
FIG. 4 is a graph showing the correlation between the OFF time and the ejection amount.
Figure 5A:
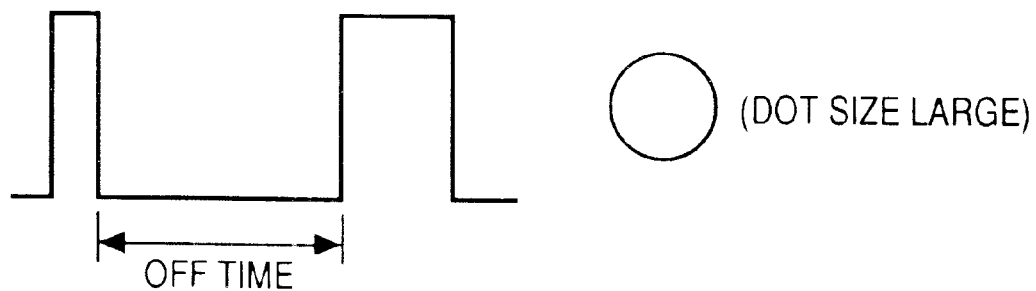
FIGS. 5A to 5C are views for explaining the relationship between the timing between a main pulse and a pre-pulse, and the size of a dot to be formed.
Figure 5B:
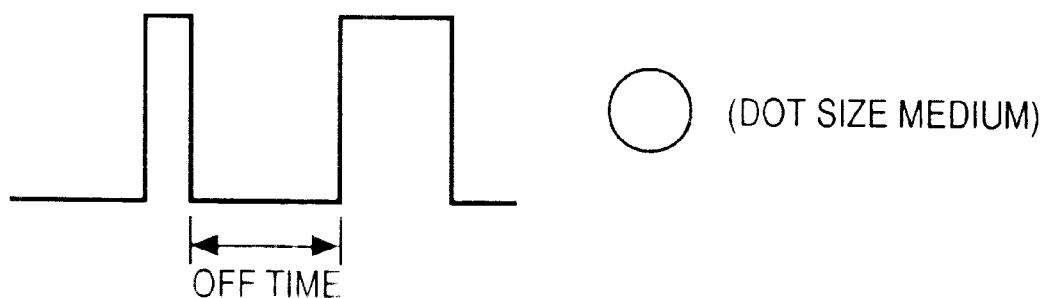
Figure 5C:
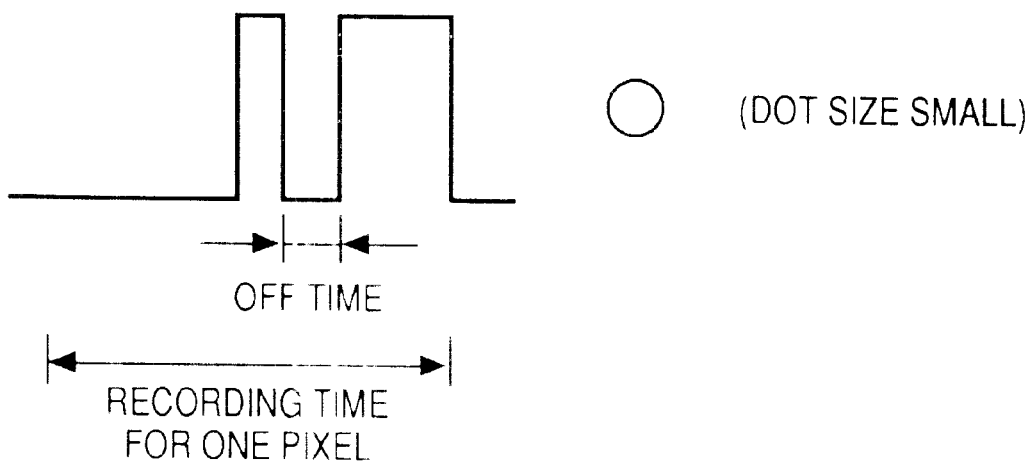

The dot area is determined by the ejection amount of an ink. The ejection amount can be changed by the bubble formation volume in the ink, and the bubble formation volume increases as the number of ink molecules which start phase transition by heat is larger. In a driving method of efficiently increasing the number of molecules, energy at a non-bubble formation limit of the ejection heater is applied to ink molecules on the heater surface (pre-pulse), and a certain time (OFF time) is assured until the applied heat is diffused to other ink molecules, thereby increasing the number of ink molecules which are ready to start phase transition. Then, when energy for ejection is applied to the ink (main pulse), the number of inks which start phase transition is increased. In this method, when the number of ink molecules which are ready to start phase transition is increased/decreased by changing the OFF time, the ink ejection amount can be changed. FIG. 4 is a graph showing the correlation between the OFF time and the ejection amount. As shown in FIG. 4, when the OFF time is prolonged, the ejection amount increases. Furthermore, FIGS. 5A to 5C are views for explaining the relationship between the time between the main pulse and the pre-pulse and the size of the formed dot. As shown in FIGS. 5A to 5C, by changing the OFF time duration, the dot size is controlled to three ranks, i.e., large (L), medium (M), and small (S). Note that the dot size is controlled to three ranks in this embodiment. However, the present invention is not limited to three ranks as long as the dot size is controlled to a plurality of ranks.

(Random Dot Image Forming Method)

The random dot image forming method will be explained below. In this embodiment, an image is formed by irregularly varying the dot areas in units of columns to be recorded. More specifically, an image is recorded by irregularly arranging a column L in which the dot area becomes larger than a standard area, a column S in which the dot area becomes smaller than the standard area, and a column M in which the dot area is equal to a standard area using the above-mentioned dot area modulation method. The arrangement order of dots L, M, and S can be determined using, e.g., a random number generator.

Figure 6:
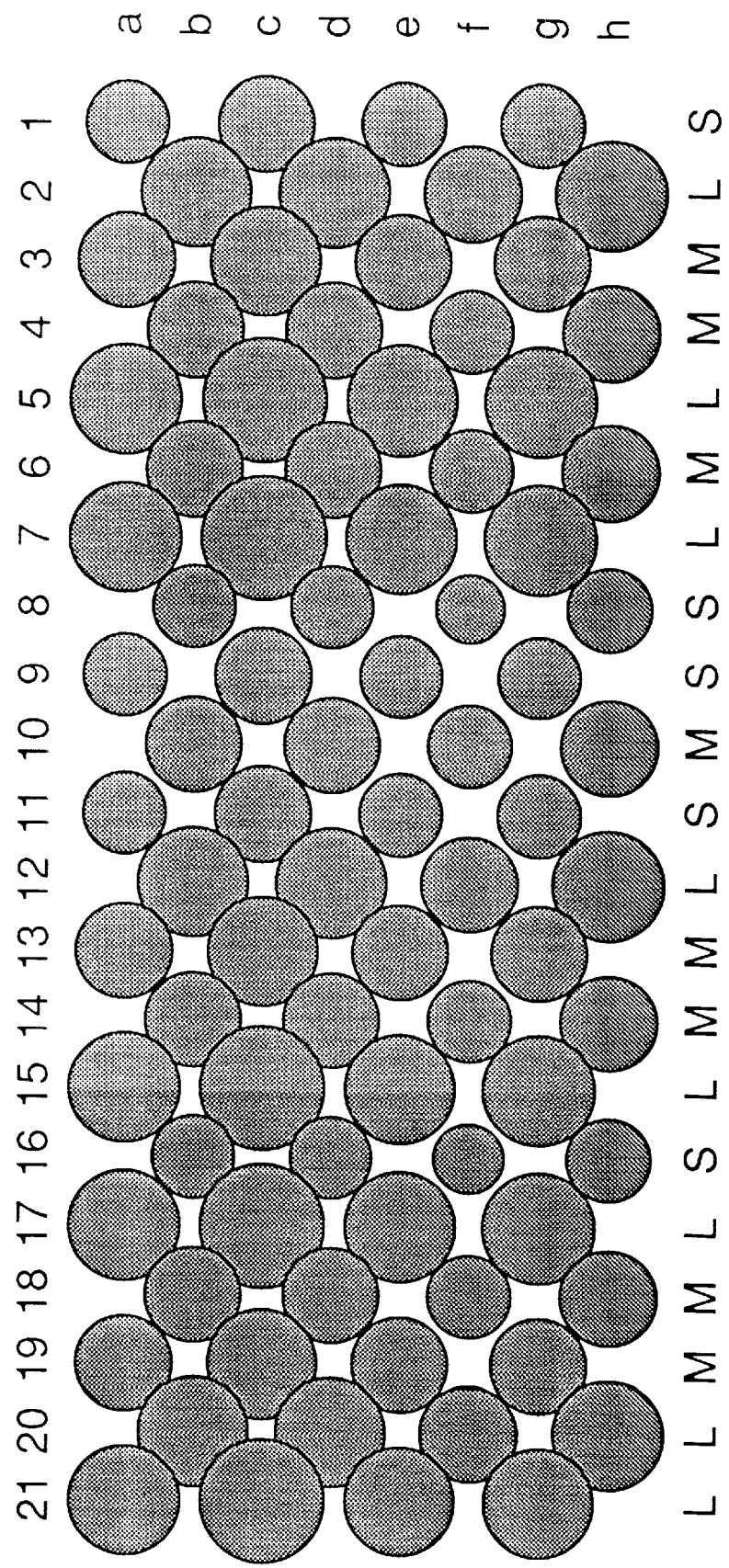
FIG. 6 is a view showing a state formed by merely irregularly changing dot areas using a recording head which suffers a variation in dot size, as shown in FIG. 35.
Figure 35:
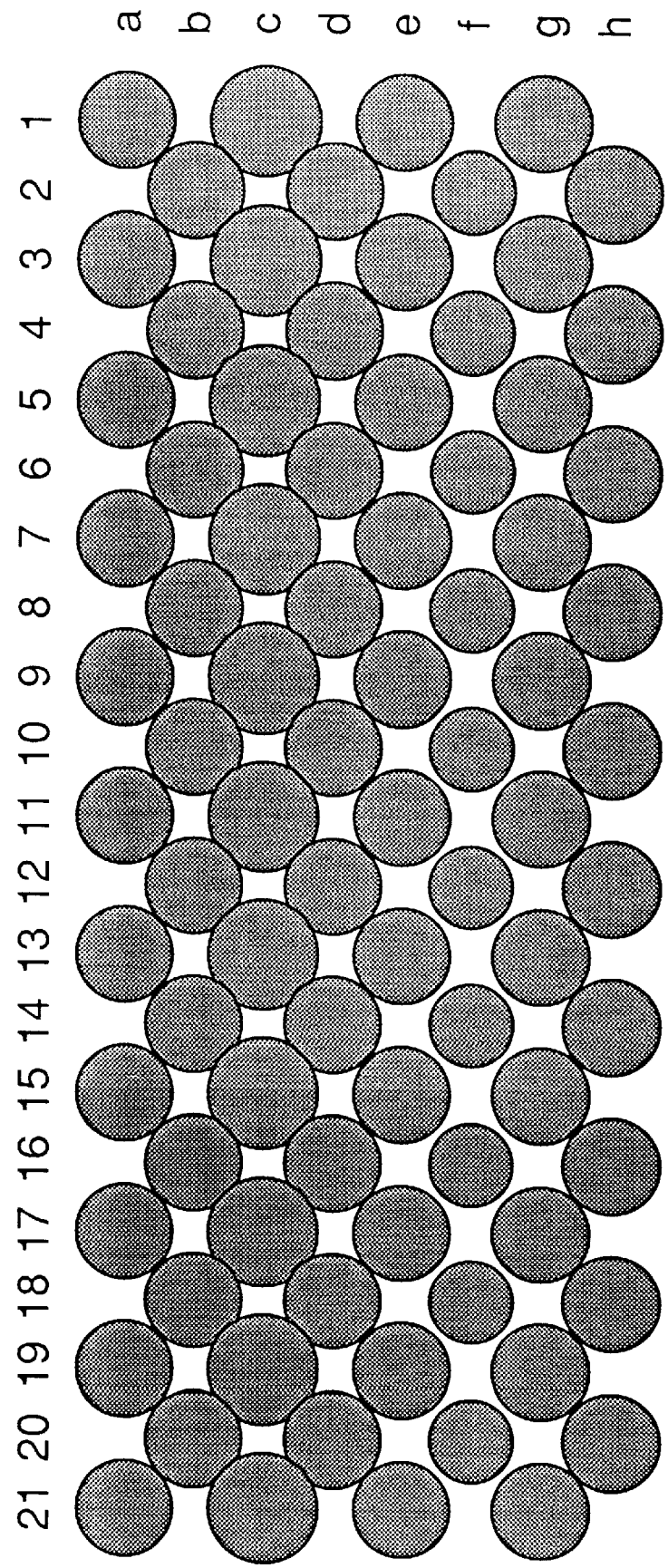
FIG. 35 is a view for explaining a state obtained when the image shown in FIG. 34 is recorded using a conventional recording head, which suffers a variation in dot area.

FIG. 6 is a view showing a state formed by dots whose areas are merely irregularly changed using a recording head 1 which suffers a variation in dot size, as shown in FIG. 35. Referring to FIG. 6, 21 columns are constituted by the following irregular dot areas. More specifically, the columns appear in the following order from the first column:

SLMMLMLSSMSLMMLSLMMLL

With this image forming method, continuity of a dot variation is eliminated, and a stripe-shaped nonuniformity appears inconspicuous. Since different dot sizes irregularly appear, dots with the same areas can be prevented from being continuously formed in the main scanning direction in any thinned-out images.

Figure 7:
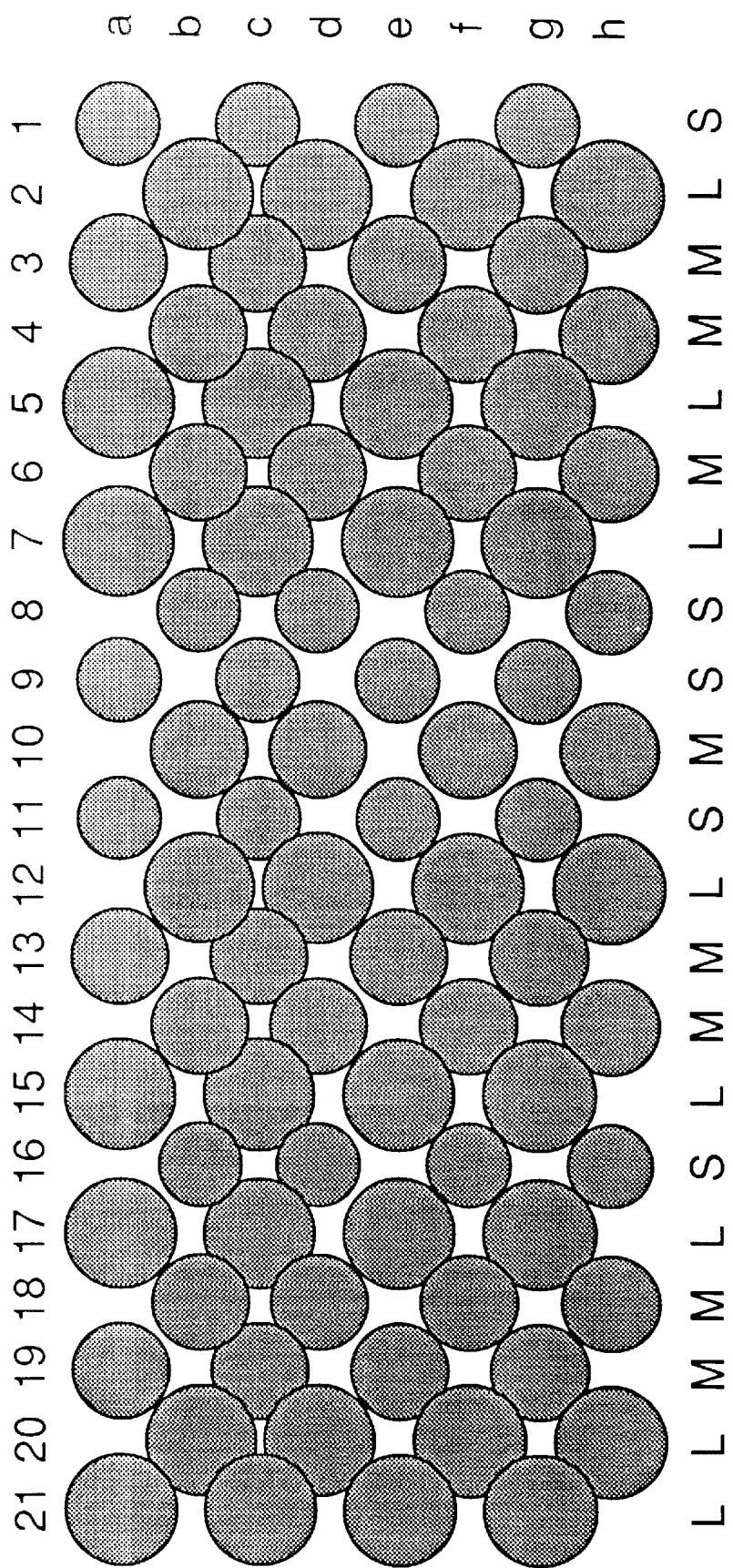
FIG. 7 is a view showing a recorded state upon application of a random dot image forming method of this embodiment to a recording head, which suffers a variation in dot formation position, as shown in FIG. 36.
Figure 36:
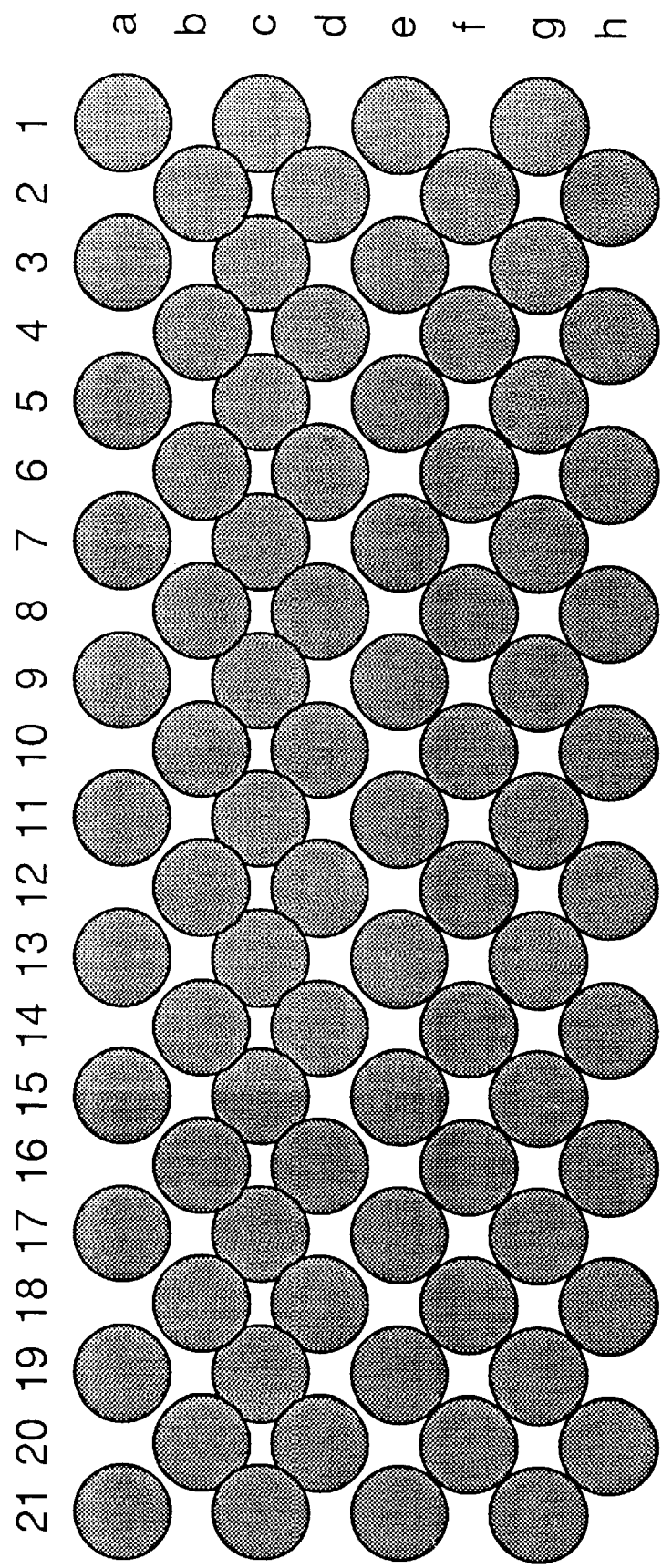
FIG. 36 is a view for explaining a state obtained when the image shown in FIG. 34 is recorded using a conventional recording head, which suffers a variation in dot formation position.

FIG. 7 is a view showing a state wherein the random dot image forming method of this embodiment is applied to a recording head, which suffers a variation in dot formation position, as shown in FIG. 36. As can be seen from FIG. 7, a stripe-shaped nonuniformity caused by offset dot positions can be eliminated.

Figure 8:
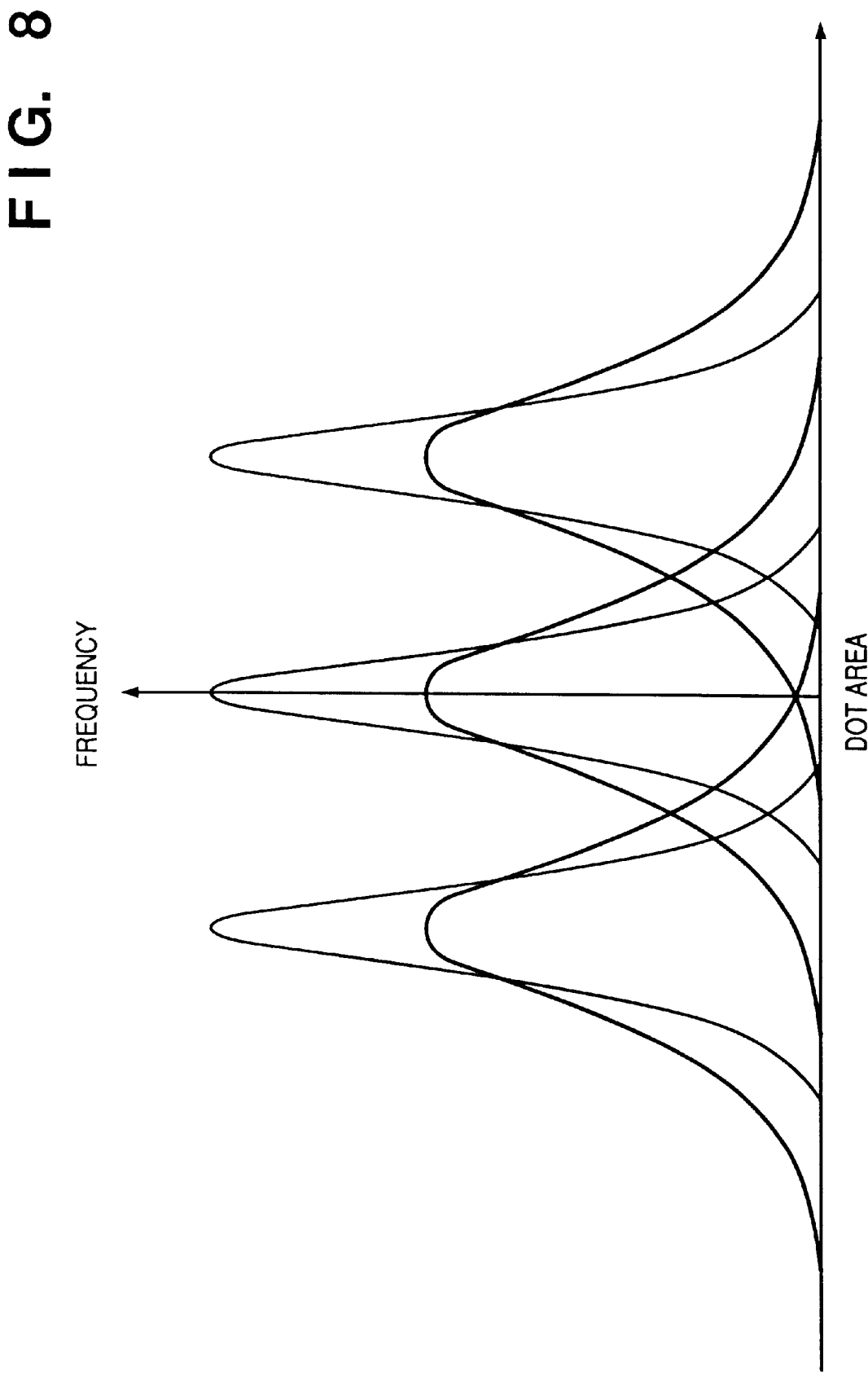
FIG. 8 is a graph showing the distribution of dot areas in units of nozzles as one of causes for nonuniformity generation.

FIG. 8 is a graph showing the dot area distributions in units of nozzles as one of causes of a nonuniformity. A thin curve represents the dot area distribution obtained when an image is recorded by a conventional normal driving method, and a bold curve represents the dot area distribution obtained when an image is recorded by the random dot image forming method. In the conventional driving method, the frequency of appearance of dots with the same area among nozzles is extremely small as compared to the frequency based on the central value of the dot area of each nozzle. This causes a nonuniformity. When the dot area is irregularly changed like in this embodiment, the frequency of appearance of dots with the same area among nozzles relatively increases, as indicated by the bold curve. In this case, since the nonuniformity among the nozzles is distributed, it becomes inconspicuous. When the degree of variation in dot area in one nozzle increases, the frequency of appearance of dots with the same area among nozzles increases, and the nonuniformity becomes inconspicuous. However, the variation range of the entire dots is widened, and the entire image becomes more noisy. For this reason, as for the variation range of the dot area in units of columns, an image is preferably designed in consideration of the balance between the overlapping state of the frequencies of appearance of dots with the same areas among the nozzles and the variation range of the dot areas by all the nozzles.

When an image is designed by merely randomly setting the generation frequency of the dot areas, the stripe-shaped nonuniformity caused by a variation in recording elements can be eliminated, but the entire image looks noisy. This is because a column band generated by concentrating dots with small dot areas and a column band generated by concentrating dots with large dot areas are formed.

In order to solve this problem, according to this embodiment, an image is formed using random patterns for more randomly arranging column band patterns for randomly driving the recording elements even in local portions. When the dot areas are controlled in this manner, dots exhibiting the same dot area tendencies are prevented from being concentrated, an image has a constant density even in local portions and can be prevented from looking granular, and image quality can be further improved. The noisy image formed in the random dot image forming method for merely irregularly changing the dot areas can be eliminated by regulating the irregularity of the dot areas to improve the quality of the image. As a regulation method in this embodiment, when the dot area modulation pattern in units of columns is changed in n ranks, n ranks are irregularly re-arranged in n columns.

Figure 9:
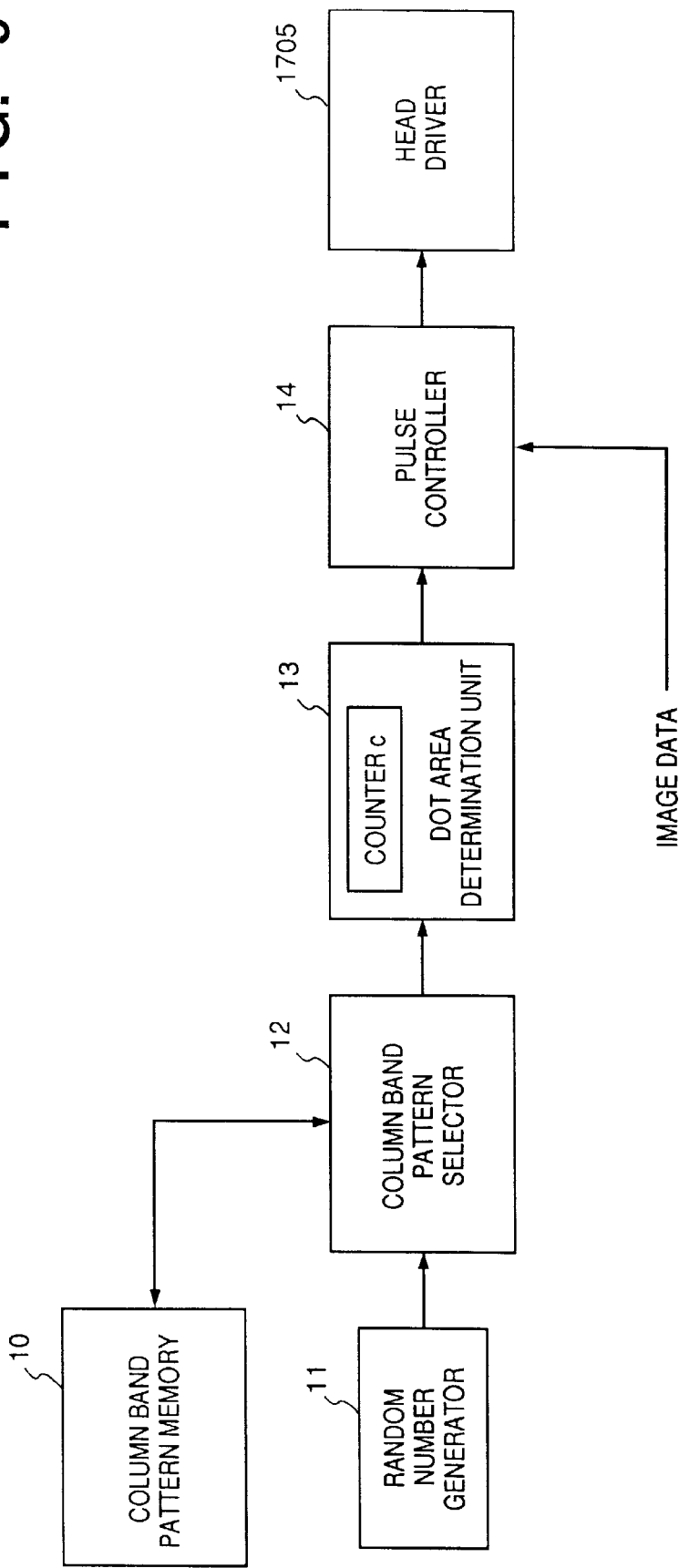
FIG. 9 is a block diagram showing the functional arrangement for realizing a random dot image forming method according to the first embodiment of the present invention.

FIG. 9 is a block diagram showing the functional arrangement for realizing the random dot image forming method according to the first embodiment, and the printer controller 1720 comprises this arrangement.

Reference numeral 10 denotes a column band pattern memory, which stores six different column band patterns "SML, SLM, MSL, MLS, LSM, and LMS" obtained by rearranging parameters for designating three area modulation ranks (L, M, and S). Reference numeral 11 denotes a random number generator for generating irregular numerical values. Reference numeral 12 denotes a column band pattern selector for selecting one of the column band patterns stored in the column band pattern memory 10 on the basis of a numerical value generated by the random number generator 11. Therefore, the column band pattern is irregularly selected. The column band pattern selected by the column band pattern selector 12 is input to a dot area determination unit 13.

The column band pattern memory 10 stores six different column band patterns, as shown in FIG. 10. The column band patterns are assigned with pattern numbers, and have information each for designating one of six different dot area modulation orders. Therefore, the random number generator 11 randomly generates numbers 1 to 6, and the column band pattern selector 12 fetches the corresponding column band pattern from the column band pattern memory 10 in accordance with the number generated by the random number generator 11.

Reference numeral 13 denotes a dot area determination unit for determining dot areas in units of columns on the basis of the dot area modulation order (e.g., in the order of S, M, and L if the column band pattern of the pattern number 1 is selected) in the column band pattern selected by the column band pattern sensor 12. Reference numeral 14 denotes a pulse controller for forming a pre-pulse and a main pulse using one of the timings shown in FIGS. 5A to 5C in accordance with the dot area determined by the dot area determination unit 13, and supplying these pulses to the head driver 1705, thereby forming area-modulated dots. Note that the pulse controller 14 receives an image signal to determine whether or not each dot is drawn.

Figure 11:
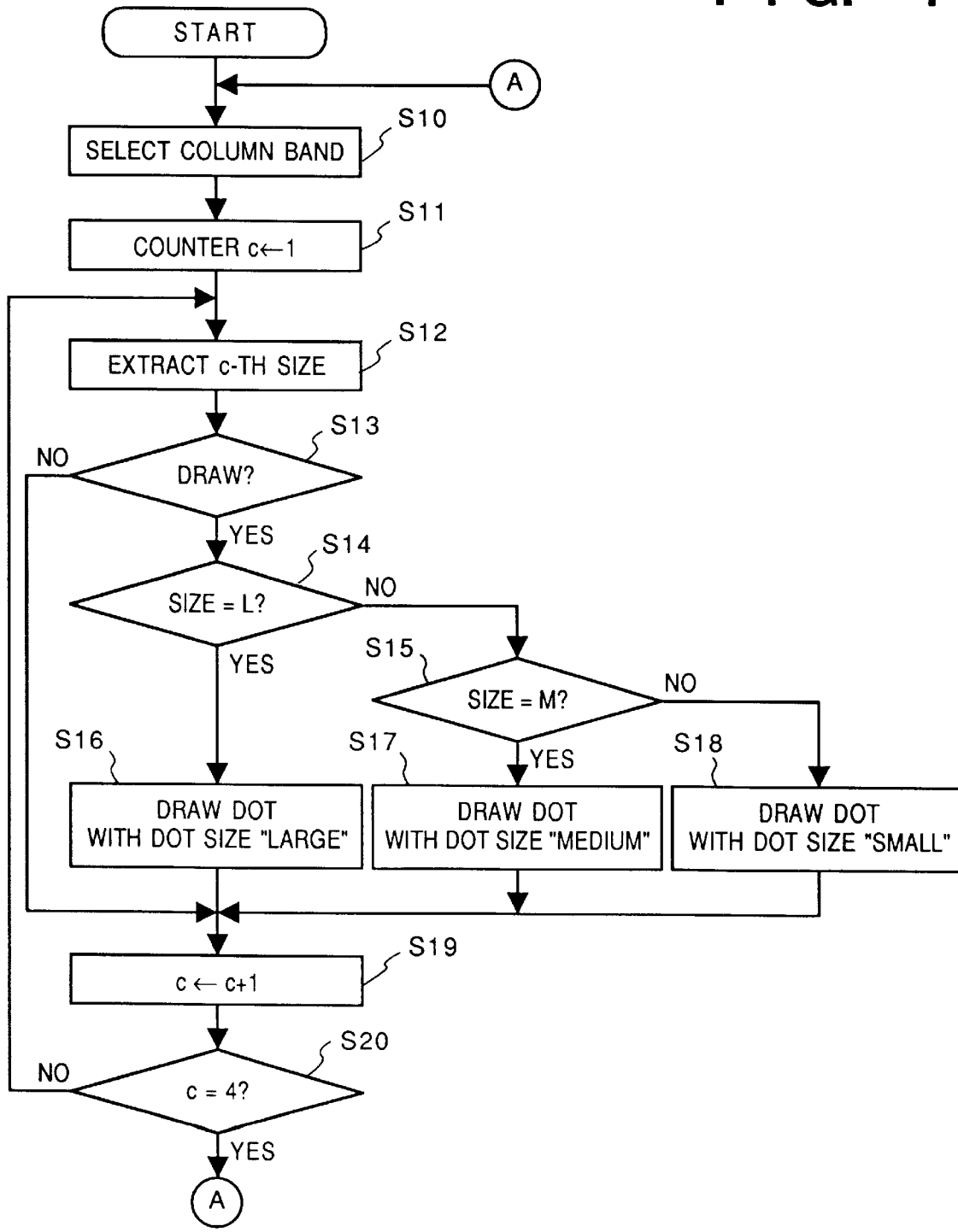
FIG. 11 is a flow chart showing the operation sequence upon drawing of dots in the first embodiment.

The above-mentioned operation will be described in more detail below with reference to a flow chart. FIG. 11 is a flow chart showing the operation sequence upon drawing of dots in the first embodiment.

When image formation is started, the column band pattern selector 12 selects a column band pattern from the column band pattern memory 10 on the basis of a random number generated by the random number generator 11 in step S10. In step S11, 1 is set in a counter c. Note that the counter c is included in the dot area determination unit 13. In step S12, which one of three different sizes of the selected column band pattern is used is determined on the basis of the numerical value of the counter c. If the column band pattern "S, M, L" is selected and the counter c=2, M is selected as the dot area size.

In step S13, the pulse controller 14 checks based on image data if the current position is a dot drawing position. If YES in step S13, the flow advances to step S14. In steps S14 to S18, a pre-pulse and a main pulse are generated in accordance with the size of a dot to be drawn, and a dot is formed. More specifically, when an L-size dot is to be drawn, the flow advances from step S14 to step S16, and a pre-pulse and a main pulse are generated at the timing shown in FIG. 5A. On the other hand, when an M-size dot is to be drawn, the flow advances from step S14 to step S17 via step S15, and pulses are generated at the timing shown in FIG. 5B. When an S-size dot is to be drawn, the flow advances from step S14 to step S18 via step S15, and pulses are generated at the timing shown in FIG. 5C.

In step S19, the count value of the counter c is incremented by 1. In step S20, it is checked if the count value of the counter c has reached 4. In this embodiment, a single column band pattern includes three different sizes. Therefore, when the count value of the counter c has reached 4, a new column band pattern is required for determining the size of the next dot to be drawn. For this reason, when the count value of the counter c has reached 4, the flow returns to step S10, and a new column band pattern is selected on the basis of a random number. On the other hand, when the count value of the counter c has not reached 4, the flow returns to step S12, and a dot is drawn using the next dot size of the current column band pattern.

On the other hand, if it is determined in step S13 that the current position is not a drawing position, the flow directly jumps to step S19 to update only the contents of the counter c. Needless to say, the above-mentioned processing shown in FIG. 11 is executed in synchronism with the image recording driving operation of the recording head 1708.

Figure 12:
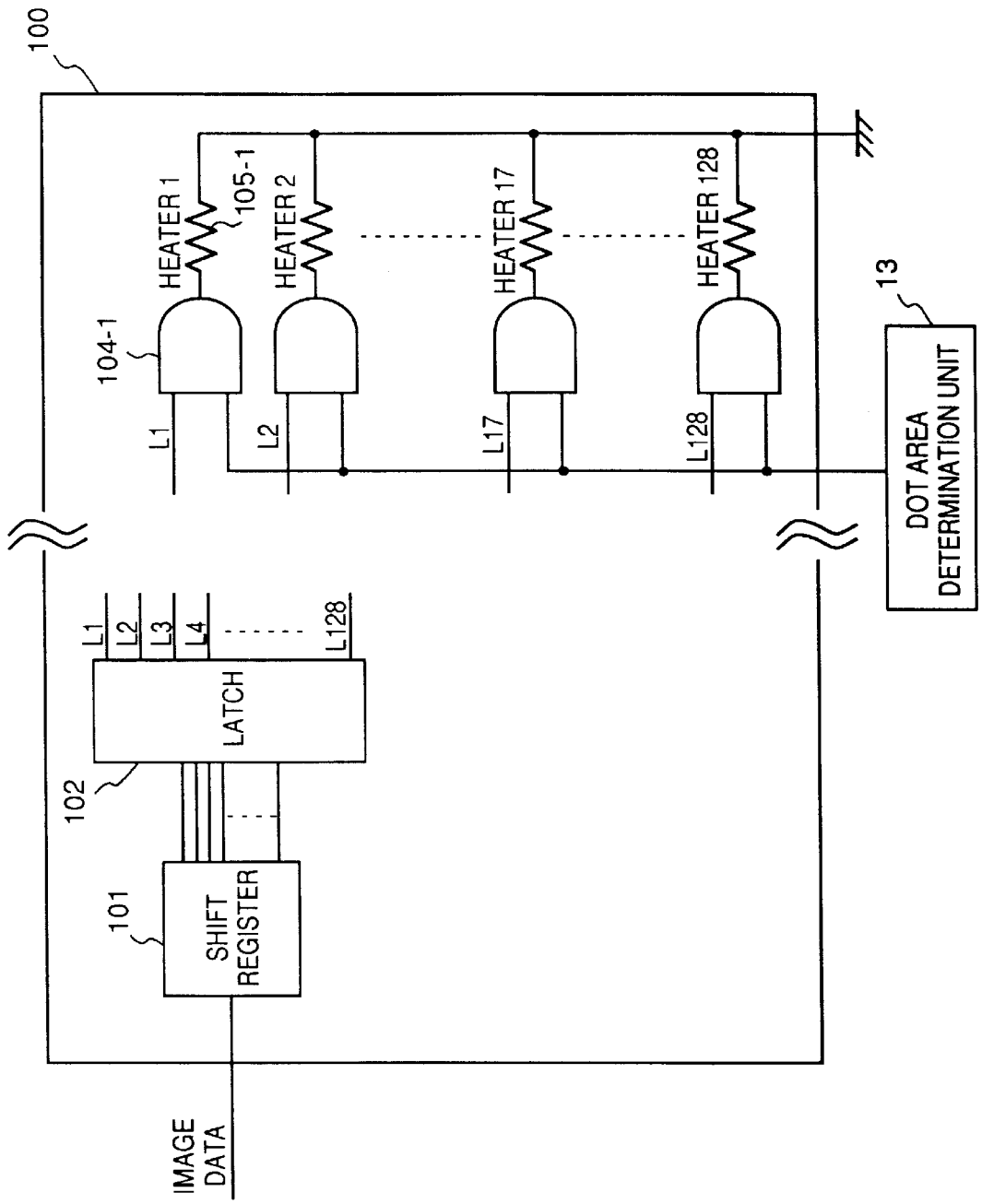
FIG. 12 is a circuit diagram showing the circuit arrangement of a driving system of the first embodiment.

FIG. 12 is a circuit diagram showing the detailed circuit arrangement of the pulse controller 14 in FIG. 9 and the head driver 1705. Each of AND gates for driving the ejection heaters receives a heater driving signal on the basis of image data, and a heat pulse (see FIGS. 5A to 5C) for forming a dot in accordance with the dot area determined by the dot area determination unit 13. Therefore, the heater which should record a dot in image formation is applied with the heat pulse signal determined by the dot area determination unit, thus realizing dot area modulation.

Figure 13:
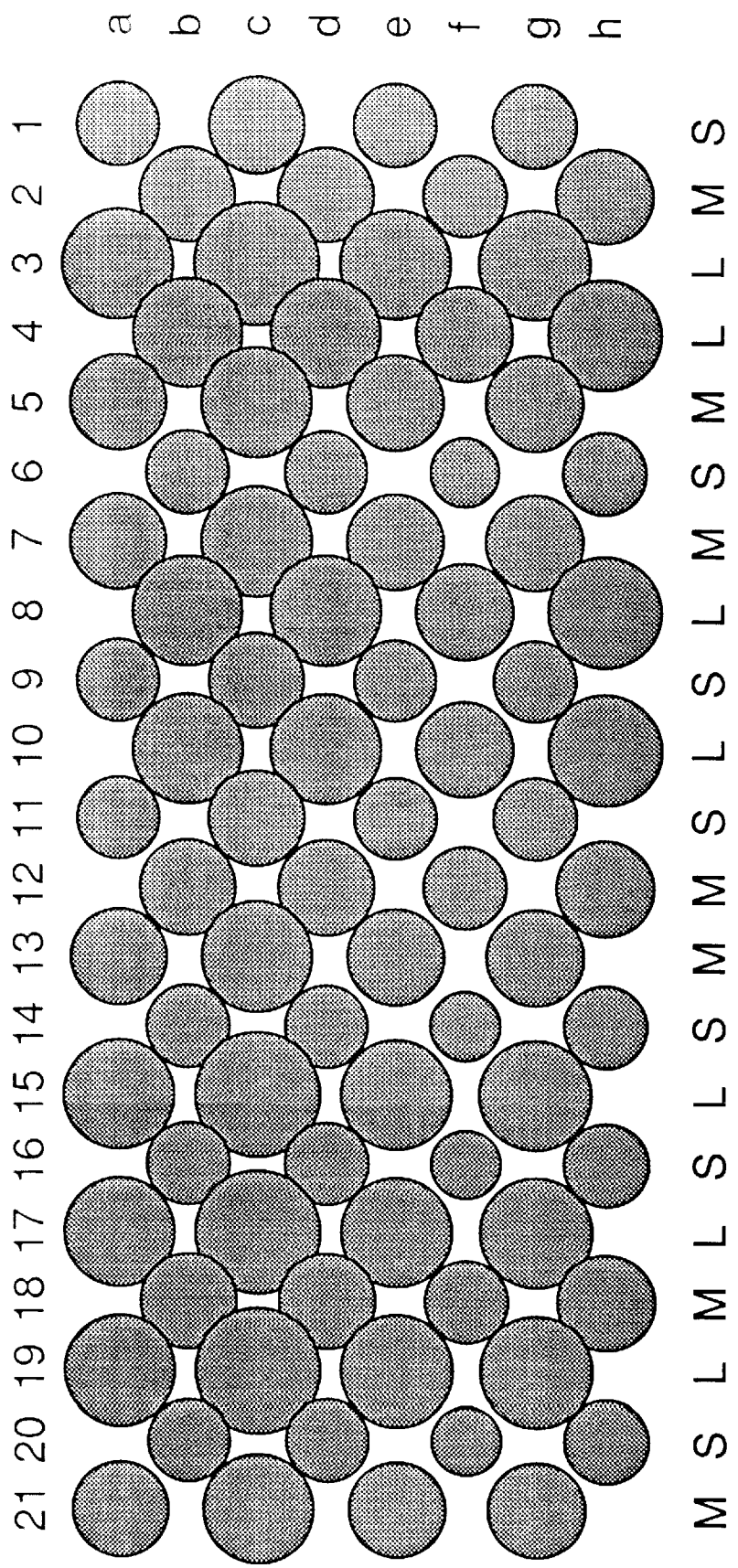
FIG. 13 is a view showing a state obtained upon application of the random dot image forming method of this embodiment to a recording head, which suffers a variation, as shown in FIG. 35.

FIG. 13 shows an example of a drawing pattern obtained by irregularly generating six different column band patterns, as described above. In FIG. 13, an image is formed by selecting the column band patterns in the following order from the first column:

SML, LMS, MLS, LSM, MSL, SLM, and LSM

FIG. 13 shows an example obtained when the above-mentioned method is applied to the recording head 1 which suffers a variation, as shown in FIG. 35. As compared to a case wherein the dot areas are merely irregularly changed (FIG. 6), granularity can be eliminated.

Figure 14:
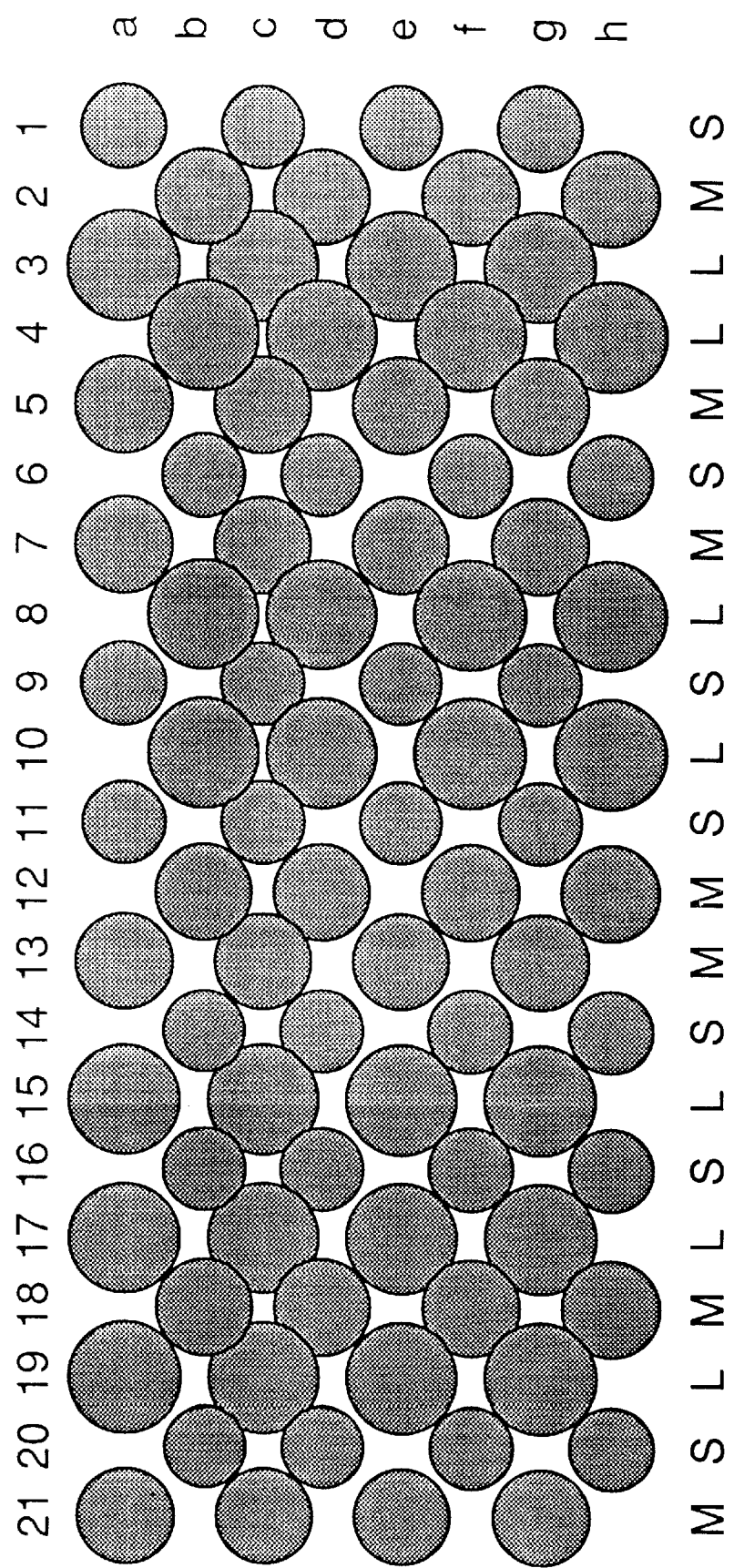
FIG. 14 is a view showing a state obtained upon application of the random dot image forming method of this embodiment to a recording head, which suffers a variation in dot landing position, as shown in FIG. 36.

FIG. 14 shows an example obtained when the random dot image forming method of this embodiment is applied to a recording head which suffers a variation in dot landing position, as shown in FIG. 36. As compared to the recorded state shown in FIG. 36, a stripe-shaped nonuniformity becomes inconspicuous. Also, as compared to a case wherein the dot areas are merely irregularly changed (FIG. 7), granularity can be eliminated.

Figure 15:
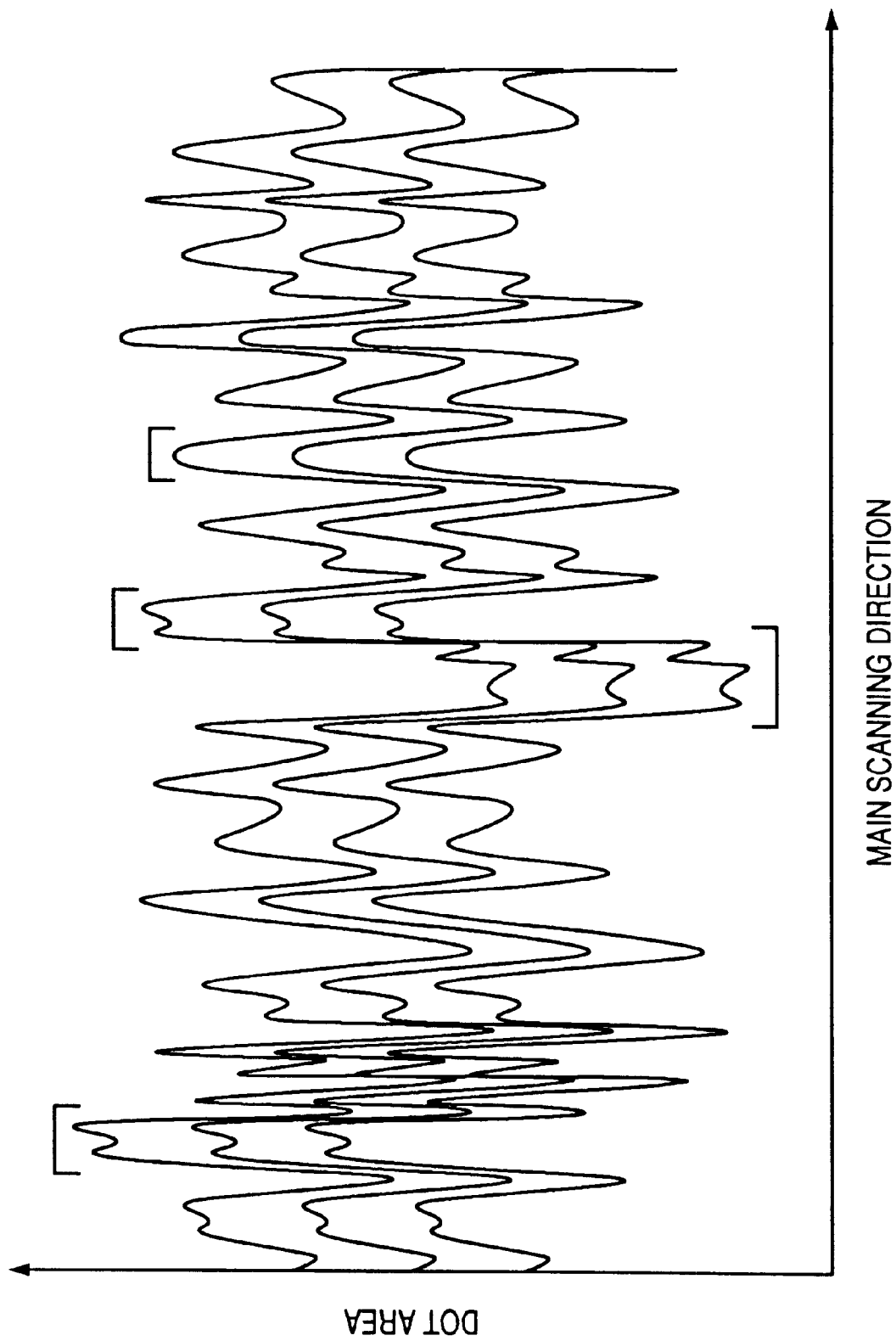
FIG. 15 is a graph showing the distribution of dot areas in one line of a 50%-halftone image obtained when dot areas are merely irregularly arranged.
Figure 16:
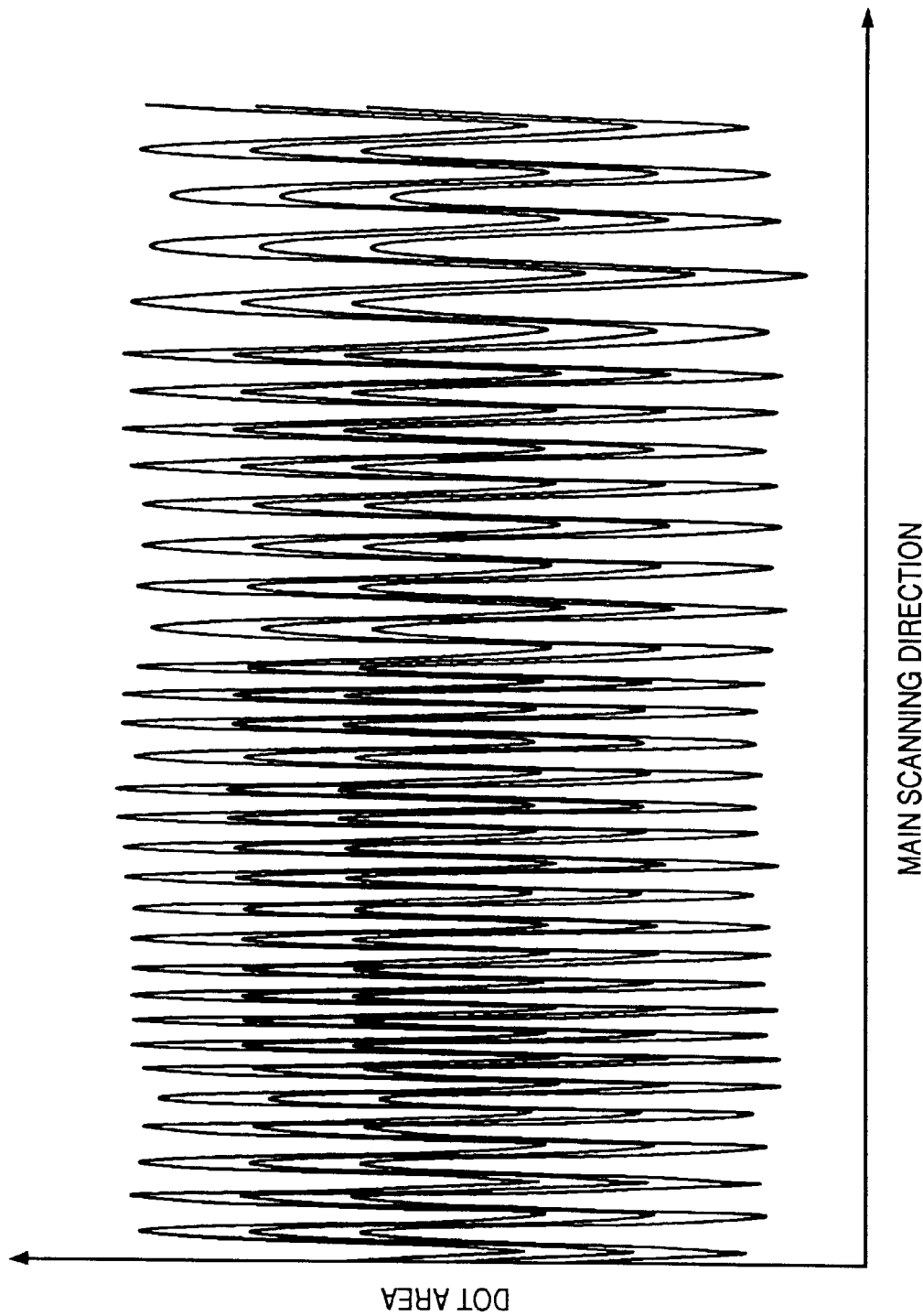
FIG. 16 is a graph showing the distribution of dot areas in one line of a 50%-halftone image obtained when column band patterns are irregularly arranged.

A difference between the random dot image forming method for irregularly arranging column band patterns and the random dot image forming method for merely irregularly arranging dots with dot areas S, M, and L will be described below with reference to FIGS. 15 and 16. FIG. 15 is a view showing the dot area distribution in one line of a 50%-halftone image obtained when dot areas are merely irregularly arranged. FIG. 16 is a view showing the dot area distribution in one line of a 50%-halftone image obtained when column band patterns are irregularly arranged. When the dot areas are merely irregularly arranged, dots having the same size tendency are locally concentrated in the main scanning direction, as shown in FIG. 15. For this reason, this image portion has granularity. When the column band patterns are irregularly arranged, the dot areas are distributed at a high frequency, and granularity can be made inconspicuous.

As described above, since groups each constituted by a plurality of parameters for designating dot areas are irregularly selected, and the dot areas are changed in accordance with the selected group, dots with different dot areas irregularly appear. For this reason, a nonuniformity caused by a variation in recording elements can be made inconspicuous, and image quality can be improved. Since the irregularly selected groups have different orders of arrangement of parameters, the dot area sizes can be more reliably distributed, and image quality can be further improved.

As described above, according to the first embodiment, an image nonuniformity and granularity can be eliminated, and a high-quality image can be formed. Furthermore, since a random number need only be generated once per three columns, the load on the MPU 1701 can be reduced.

<Second Embodiment>

As described above, the first embodiment can eliminate an image nonuniformity and granularity in one line. In the above-mentioned first embodiment, there are n factorial (n!) column band patterns each constituted by re-arranging columns corresponding to n dot area modulation driving ranks, and these patterns are irregularly generated. In this embodiment, n! patterns are further re-arranged and generated. More specifically, n! column band patterns are re-arranged in (n!)! ways, and the dot area sizes are determined by sequentially using these patterns.

For example, for columns corresponding to three dot area modulation driving ranks S, L, and M, there are 6 (=3×2×1) column band patterns obtained by rearranging these columns. Furthermore, by re-arranging the column band patterns, there are 720 (=6×5×4×3×2×1) group patterns. When these 720 group patterns are sequentially used, a modulation pattern including 720×6 column band patterns as one period is obtained (one group pattern includes six column band pattern). More specifically, this pattern becomes one having a period of 12,960 (=3×6×720) columns (one column band pattern consists of three columns). When the column band pattern selector 12 comprises this pattern, the random number generator 11 in the first embodiment can be omitted. More specifically, the random number generator 11 is omitted in FIG. 9, and the column band pattern selector 12 comprises the above-mentioned pattern having the period of 12,960 columns.

In the second embodiment, the above-mentioned 720 different group patterns are stored in the column band pattern memory 10 in the form of a group pattern table. FIG. 17 is a view for explaining the storage state of group patterns in the group pattern table of the second embodiment. As shown in FIG. 17, 720 different group patterns (indicating the selection order of column band patterns) are stored in correspondence with group numbers. Upon selection of a column band pattern, when a (Cg)-th pattern number in a group number g is selected, the table shown in FIG. 10 is looked up, and the corresponding column band pattern is acquired.

Figure 18:
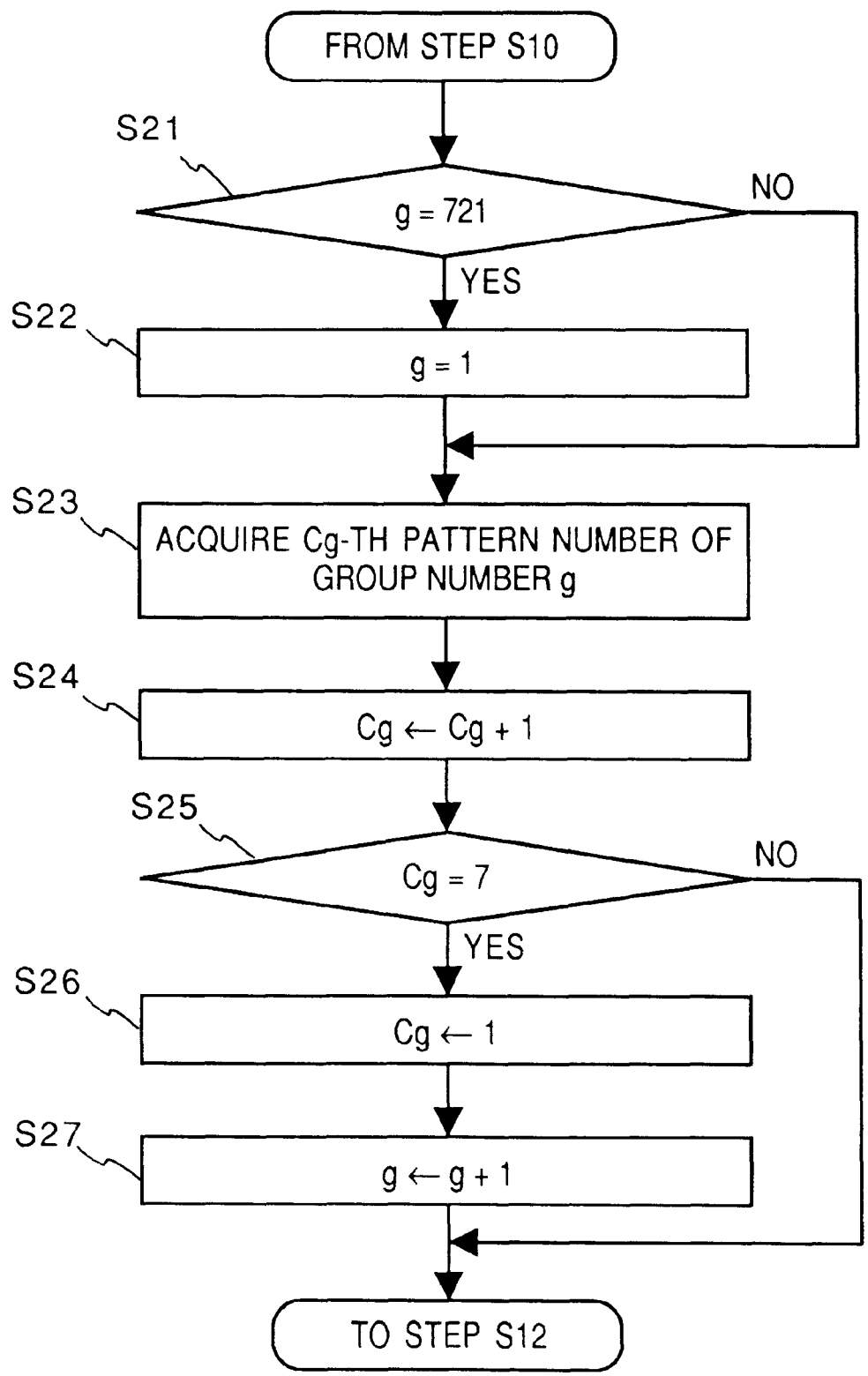
FIG. 18 is a flow chart showing the selection sequence of column band patterns in the second embodiment.

FIG. 18 is a flow chart showing the selection sequence of column band patterns in the second embodiment. Note that the flow chart in FIG. 18 is used for explaining in detail step S11 in the flow chart in FIG. 11. Prior to the start of this processing, the group number g and a counter Cg are initialized to "1".

Referring to FIG. 18, it is checked in step S21 if the group number has reached 721. If YES in step S21, 1 is set in g in step S22. This is processing for selecting a column band pattern by resetting the group number to that of the first group upon completion of area modulation using 720 groups (i.e., upon completion of ejection of 12,960 columns), so as to continue area modulation.

In step S23, a (Cg)-th pattern number of the group number g is acquired from the group table shown in FIG. 17. This is the number for designating the column band pattern.

In step S24 and subsequent steps, various variables for the next column band selection processing are set. More specifically, Cg is incremented by 1 in step S24, and it is checked in step S25 if Cg has reached 7. If YES in step S25, this means all pattern numbers in the current group number are acquired. Therefore, Cg is reset to 1, and the group number is advanced to the next one.

With the above-mentioned processing, random area modulation in units of columns can be executed without using any random number generator. For this reason, the load on the MPU 1701 can be further reduced. When the order of group patterns is appropriately set, noise of an image can be more effectively eliminated than a case using the random numbers.

Figure 19:
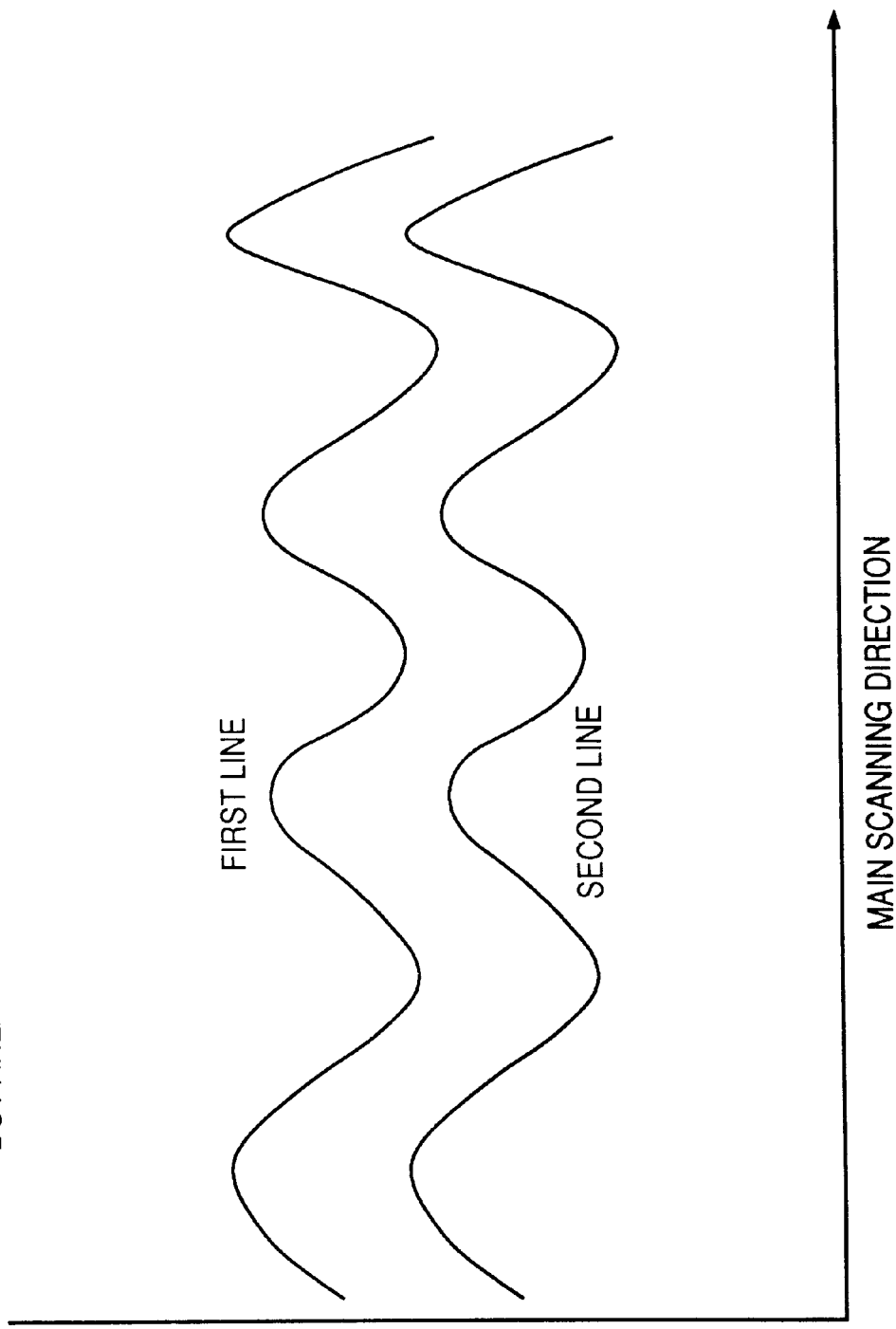
FIG. 19 is a graph showing the distribution of dot areas in a 50%-halftone image obtained when the method of the second embodiment is used.

When this recording apparatus has a resolution of 360 dpi, 36 inches correspond to one period. When an image whose one line is, e.g., about 36 inches is recorded, a stripe is formed in the recorded image in the direction (to be referred to as a sub-scanning direction hereinafter) perpendicular to the main scanning direction. FIG. 19 is a view showing the dot area distribution of a 50%-halftone image obtained when the method of the second embodiment is used. As can be seen from FIG. 19, since patterns of appearance of identical dot areas are synchronized between lines, a phenomenon of forming a stripe in the sub-scanning direction occurs.

Figure 20:
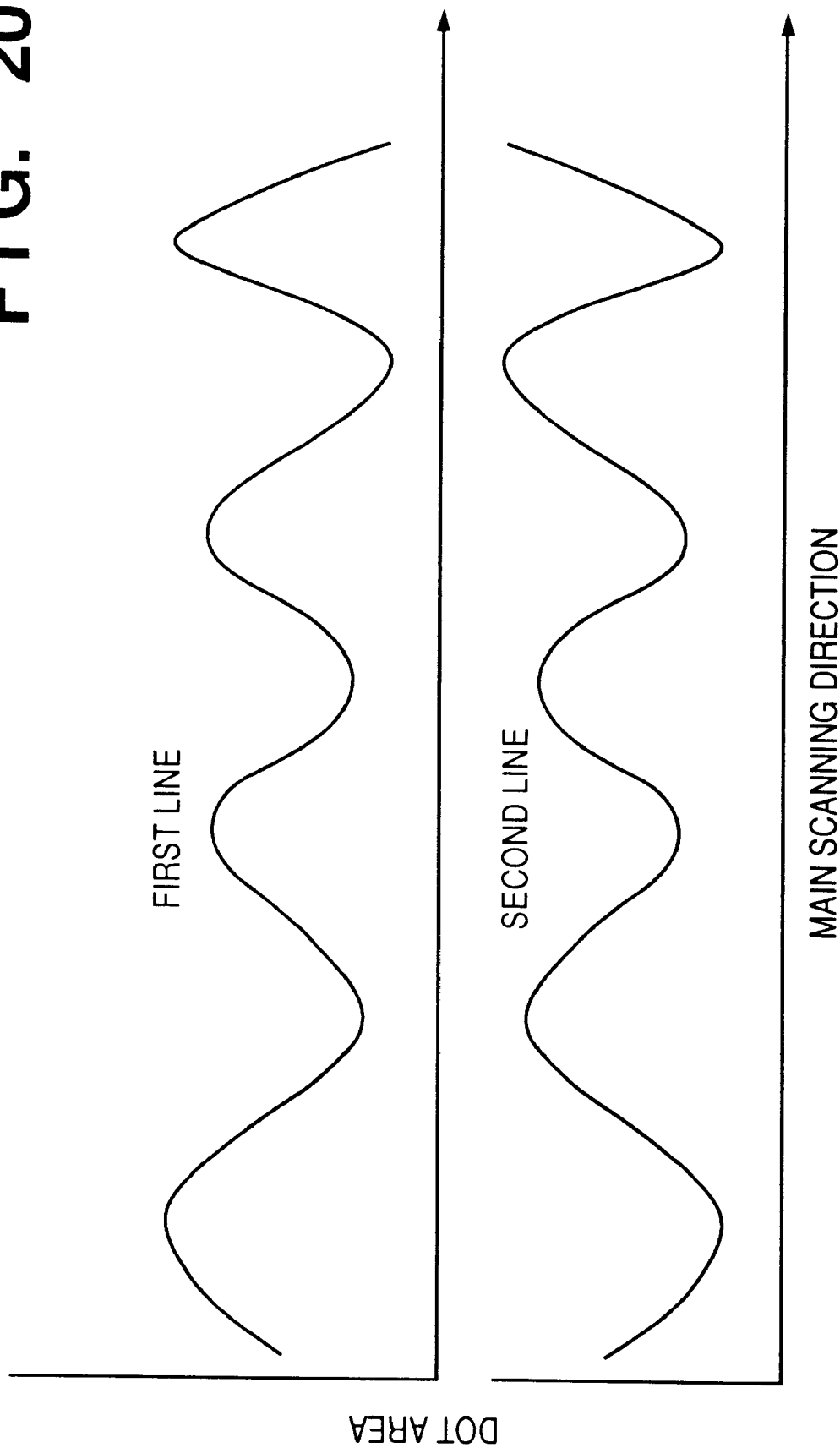
FIG. 20 is a graph showing the distribution of dot areas in a 50%-halftone image obtained when a further improved method of the second embodiment is used.

In order to prevent this, in a modification of the second embodiment, the dot area distribution pattern of each line is generated to have a phase opposite to that of the immediately preceding line, thereby eliminating the above-mentioned synchronization. FIG. 20 shows this state. FIG. 20 is a view showing the dot area distribution of a 50%-halftone image obtained when the improved method of the second embodiment is used. In this manner, a stripe in the sub-scanning direction of the image can be eliminated.

In this case, the area modulation distribution (i.e., the distribution of L, M, and S) for one scan is set, and the order of group patterns for canceling this distribution is determined. Based on this order, a group table for the next line is generated. More specifically, two group tables shown in FIG. 17 are prepared, and are switched in units of lines, thus realizing this modification.

As described above, according to the method of the second embodiment, since the random number generator 11 can be omitted, the structure can be simplified as compared to the first embodiment. In addition, the load on the MPU 1701 can be reduced.

<Third Embodiment>

Figure 21:
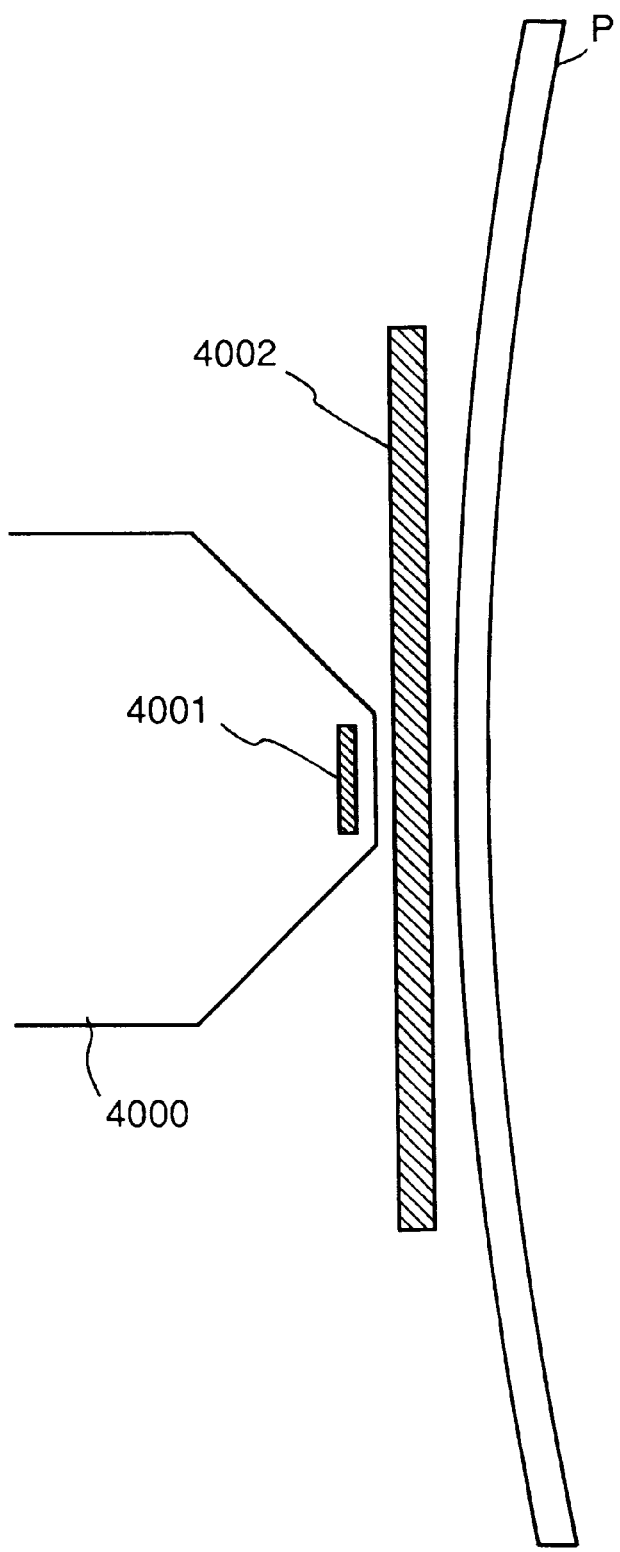
FIG. 21 is a view for explaining a recording head based on a thermal transfer method according to the third embodiment of the present invention.
Figure 22:
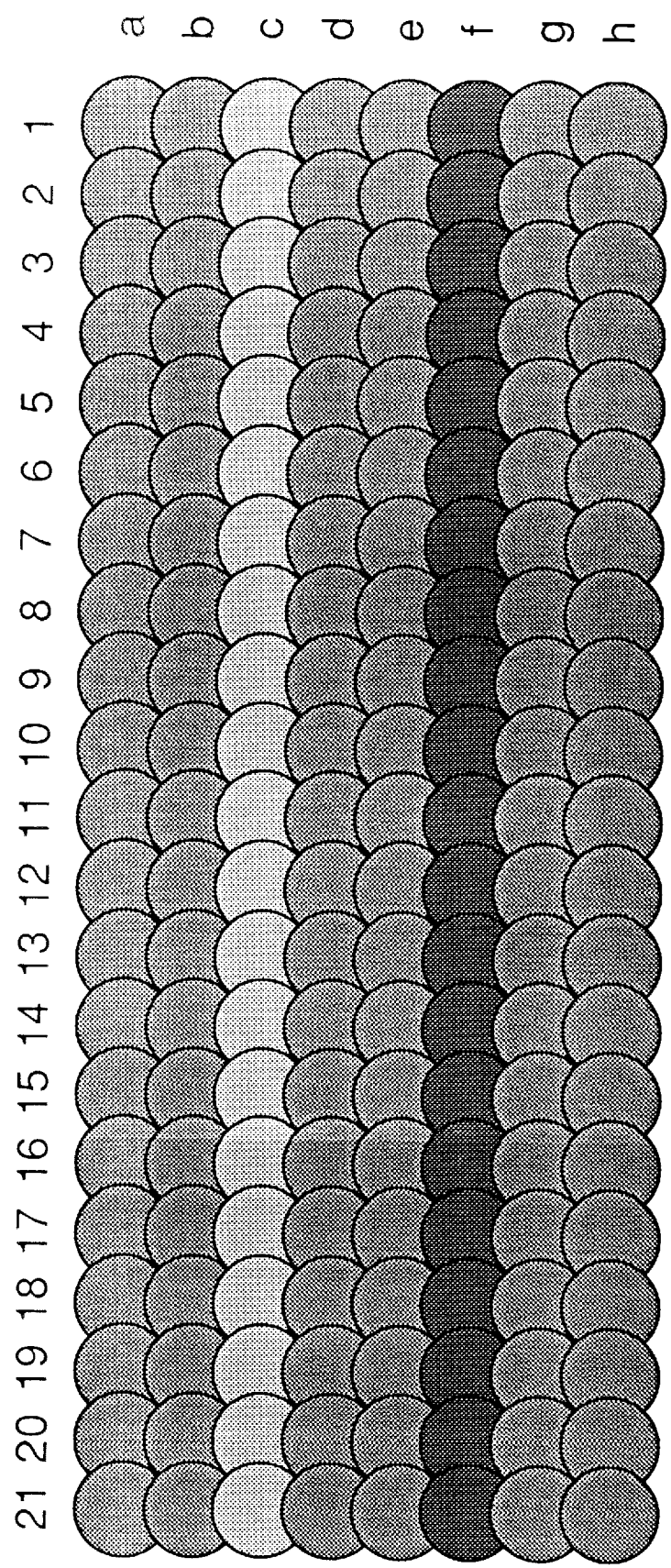
FIG. 22 is a view for explaining a state recorded by a recording head which suffers a variation in dot density of recording elements.

In the above embodiments, the present invention is applied to the ink-jet system. In the description of the third embodiment, the present invention is applied to a thermal transfer system recording apparatus. FIG. 21 is a view for explaining a thermal transfer system recording head of the third embodiment. As shown in FIG. 21, the thermal transfer system uses a heating member 4001 as a recording element. The heating member generates heat in accordance with an electrical signal to melt a solid-state ink of an ink ribbon 4002, and transfers the melted ink onto a recording medium P, thus forming a dot. With this system, the melting amount of the ink changes depending on the temperature of the heating member. More specifically, as the temperature of the heating member is higher, the melting amount of the ink increases. For this reason, when the recording element temperature of the surface, contacting the ink ribbon, of the heating member varies due to a variation in resistance due to the thickness of the heating member, and a variation in surface state of the heating member, the melting amount of the ink varies. In the case of the thermal transfer system, the variation in ink melting amount leads to a variation in dot density, and a stripe-shaped nonuniformity is formed by different densities, as shown in FIG. 22. As can be seen from FIG. 22, a nonuniformity is generated since an image is recorded by a recording head in which the density of dots c is lower than that of standard dots (a, b, d, e, g, and h), and the density of dots f is higher than that of the standard dots.

As the ink melting amount becomes larger, the dot density becomes higher; as the ink melting amount becomes smaller, the dot density becomes lower. The temperature of the heating member is determined by a current supplied to the heating member when the voltage to be applied to the heating member is assumed to be constant. More specifically, the dot density can be controlled by the pulse width of a signal to be supplied to the heating member. In this embodiment as well, when the dot density is merely randomly changed, the formed image is blurred as a whole. From a macroscopic viewpoint, the dot area is equivalent to the dot density, and the above-mentioned phenomenon occurs for the same reason as that described in the first embodiment, i.e., due to generation of a portion where dots with the same density are concentrated.

In the third embodiment, an image blur caused by dots with random densities is eliminated by irregularly changing the dot densities in units of columns by the same method as in the first embodiment. In this manner, the density distribution of dots with continuity is distributed, and a stripe-shaped nonuniformity can become inconspicuous. The density nonuniformity becomes more conspicuous in a recorded pixel image with a high recording duty, as shown in FIG. 22. When the dot densities of the above-mentioned image are irregularly modulated in units of columns by the same method as in the first embodiment, an image shown in FIG. 23 can be obtained. Note that the density modulation is realized by changing the pulse width of a signal to be applied to the heating member.

Figure 23:
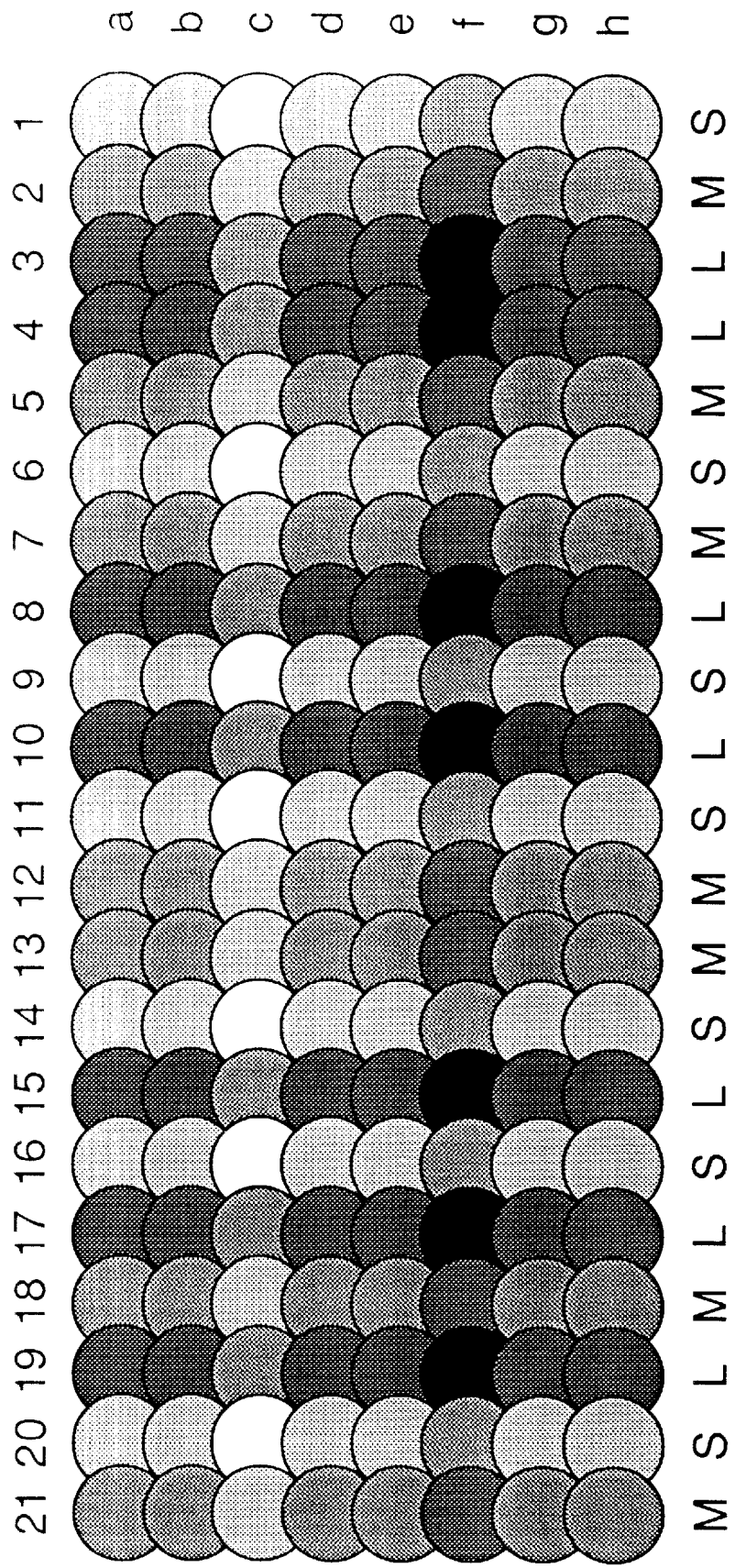
FIG. 23 is a view for explaining a recorded state obtained upon application of the method of the third embodiment to the pattern shown in FIG. 22.

FIG. 23 shows an image constituted by a column L having a dot density higher than a standard density, a column S having a dot density lower than the standard density, and a column M having the standard dot density. This image is formed by changing the density in the following order from the first column:

SML, LMS, MLS, LSM, MSL, SLM, LSM

Figure 24:
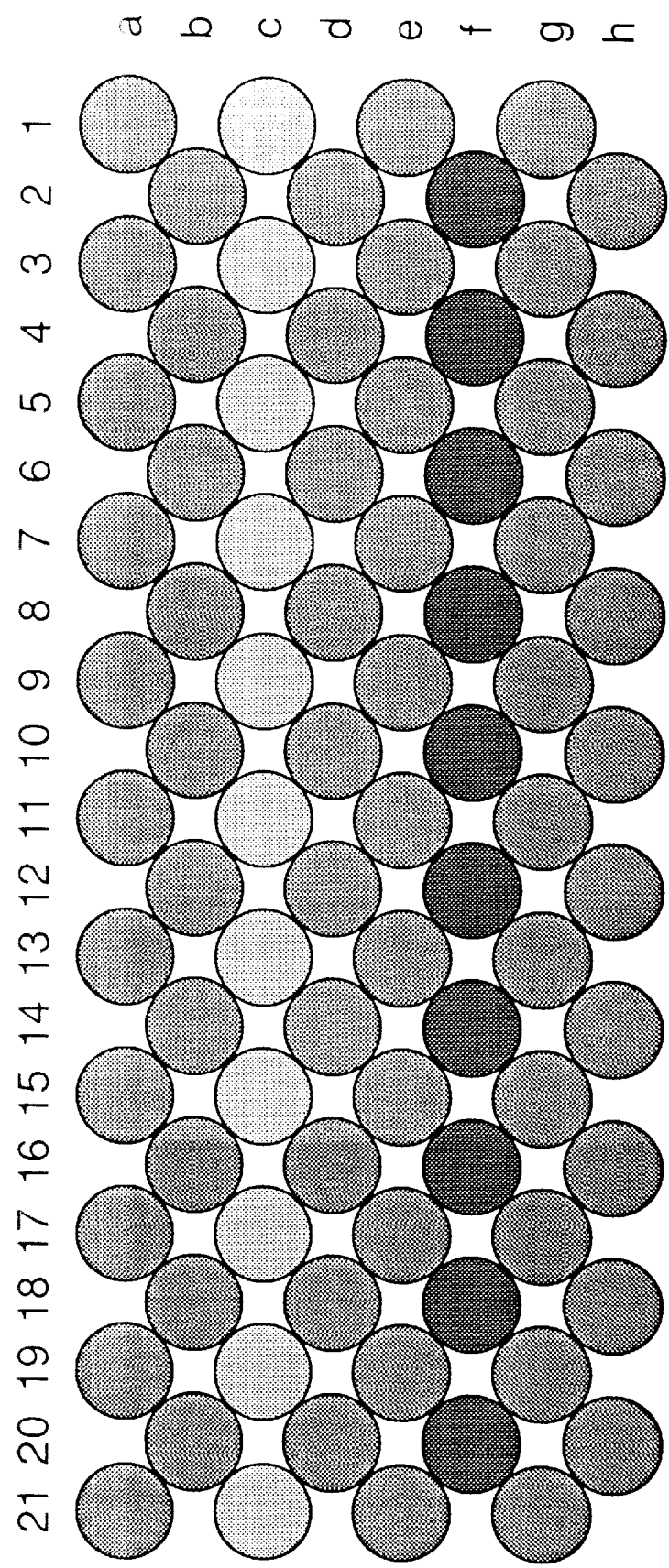
FIG. 24 is a view showing a 50%-halftone image obtained by thinning out the image shown in FIG. 22.
Figure 25:
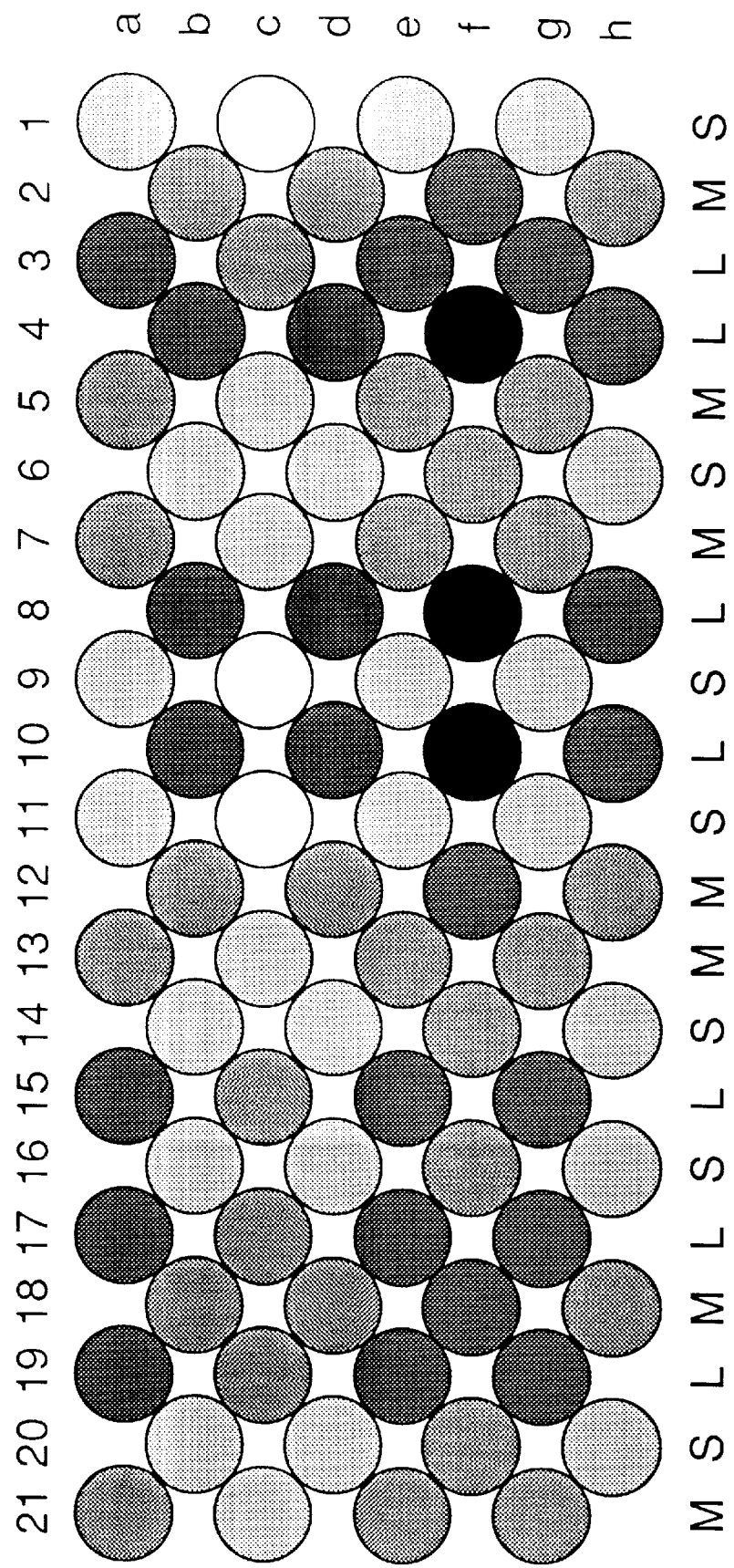
FIG. 25 is a view showing a 50%-halftone image obtained by thinning out the image shown in FIG. 23.

The method of generating such columns with different densities is the same as that in the first embodiment, and a detailed description thereof will be omitted. FIG. 24 shows a 50%-halftone image obtained by thinning out the image shown in FIG. 22. When the above-mentioned irregular density modulation is applied to this image, an image shown in FIG. 25 is obtained, and the same effect as described above can be obtained.

As described above, according to the above embodiments, a stripe-shaped nonuniformity or the like on an image is suppressed by irregularly changing the dot area or density in units of columns to form random dots, and the method of generating random dots is regulated to make granularity inconspicuous.

Also, since the dot sizes formed by the recording elements are randomly changed, a regular change in dot size can be prevented, and image quality of a recorded image can be improved.

<Fourth Embodiment>

The fourth embodiment of the present invention will be described below.

Figure 26:
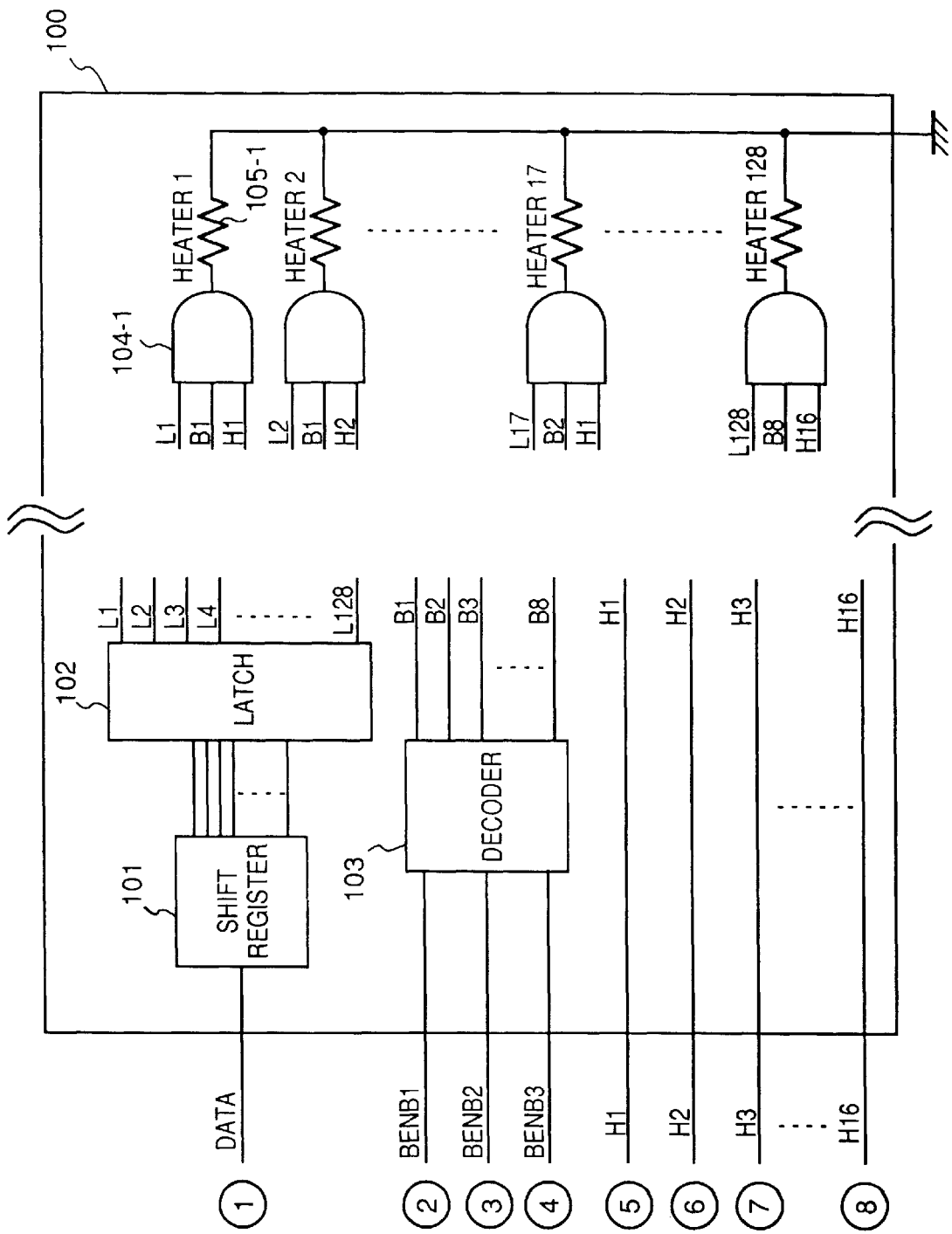
FIG. 26 is a block diagram showing the logic arrangement in a head chip in a recording head according to the fourth embodiment of the present invention.

A recording head used in this embodiment is an inkjet recording head having a resolution of 360 DPI and comprising 128 nozzles. The 128 nozzles are divided into 8 blocks in units of 16 nozzles, and ejection control is made in units of blocks. The logic arrangement in a head chip in the recording head of this embodiment will be briefly described below with reference to FIG. 26. FIG. 26 is a block diagram showing the logic arrangement in the head chip in the recording head of this embodiment.

A logic circuit of a head chip 100 receives three different signals for recording (a recording data signal, a block selection signal, and heat signals). These signals and their functions will be explained below.

The recording data signal (DATA) is a signal for selecting a heater of the nozzle to be driven. The recording data signal DATA is serially input to a shift register 101 in the head chip 100. When the shift register 101 has stored 128 data corresponding to all the nozzles, these data are parallelly output to a latch 102 in synchronism with a latch signal (not shown). The latch 102 outputs the image signal to AND gates 104 arranged in correspondence with the number of nozzles (128 nozzles).

The block selection signal (3 bits BENB1 to BENB3) is a signal for designating a block including heaters to be driven. As described above, this recording head has the 128 nozzles, which are divided into 8 blocks in units of 16 nozzles. The recording head is controlled to be time-serially driven in units of blocks. For this reason, a function of time-serially selecting blocks (16 nozzles) including nozzles to be simultaneously subjected to driving control is required. The 3-bit block selection signal for selecting one of the eight blocks is input to a decoder 103. The decoder 103 decodes the block selection signal, and enables a corresponding one of eight signals B1 to B8. In the recording head, the nozzles are divided into blocks in units of 16 nozzles from the uppermost nozzle. For this reason, the signal B1 is connected to the 16 AND gates of nozzles 1 to 16, the signal B2 is connected to the 16 AND gates of nozzles 17 to 32, and the same applies to the remaining signals.

The heat signals (16 signals H1 to H16) are signals each for determining the driving time of a corresponding ejection heater 105. Sixteen signal lines are arranged in correspondence with the number of nozzles in one block (in FIG. 26, only four signal lines are illustrated). Each signal line is connected to every 16 nozzles from the uppermost nozzle. More specifically, the signal line H1 as the first heat signal line is connected to the AND gates 104-1, 104-17, 104-33, ..., the signal line H2 is connected to the AND gates 104-2, 104-18, 104-34, ..., the signal line H16 is connected to the AND gates 104-16, 104-32, ..., 104-128.

As can be seen from FIG. 26, the ejection heater 105-1 of the nozzle 1 is turned on while three signals, i.e., the data signal L1, the block selection signal B1, and the heat signal H1, connected to the AND gate 104-1 of the heater 105-1 are enabled.

Figure 27:
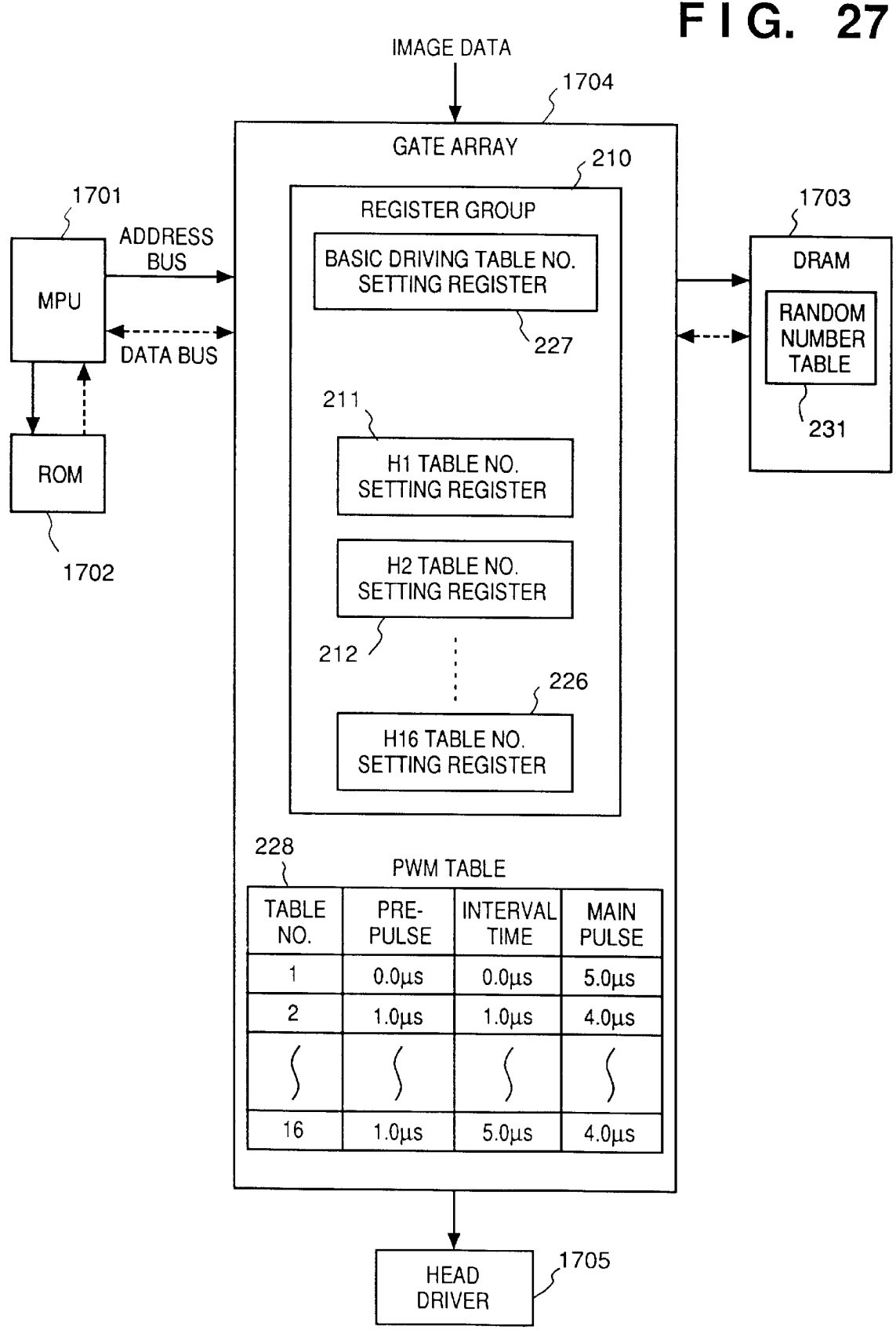
FIG. 27 is a block diagram showing the control arrangement for realizing random dot control.

A dot size modulation means is realized by modulating the pulse width of a heat pulse, as described above. More specifically, random dot size control is realized by randomly controlling, in units of heat dots, the pulse pattern (single-pulse, double-pulse, and the like) of a heat pulse, and pulse signals to be supplied to the heat signal lines H1 to H16 (FIG. 26) for controlling the pulse width. The random dot size control will be described in detail below with reference to FIG. 27. FIG. 27 is a block diagram showing the control arrangement for realizing the random dot control.

Referring to FIG. 27, reference numeral 1701 denotes an MPU of this recording apparatus. The MPU 1701 exchanges data via a data bus indicated by a double-headed broken arrow in FIG. 27 from an address designated via an address bus indicated by a solid arrow in FIG. 27. Note that the minimum recording period of this recording apparatus is 6 kHz, and the 128 nozzles are subjected to driving control while being divided into eight blocks in units of 16 nozzles. This block interval is 10 $\mu$s. In the printing operation, the MPU 1701 transfers a 6-kHz trigger pulse to a gate array 1704. Upon reception of this trigger pulse, the gate array 1704 is controlled to switch the block selection signal at 10-$\mu$s block intervals, and to input to the switched signal to the recording head.

At this time, the data signal (DATA) for selecting the nozzles to be driven has already been input from a data signal line to the shift register 101 of the recording head. The data from the shift register 101 are latched in accordance with latch pulses (not shown), and the already latched recording data are input to the corresponding AND gates 104 connected to the ejection heaters. In this manner, a block to be selected and nozzles to be turned on (driven) in the selected block are determined. When the heat signals (H1 to H16) for determining heat conditions are input to the recording head in this state, energy is applied to the ejection heaters of the selected nozzles.

The gate array 1704 comprises a register group 210 for setting various conditions and a PWM table 228. The register group 210 includes a basic driving table NO. setting register 227 for storing a setting value of a basic driving pulse (to be described later), and H1 to H16 table NO. setting registers 211 to 226 for storing pulse patterns of corresponding heat signals. In the PWM table 228, various pulse patterns with different ejection amounts are registered.

Figure 28:
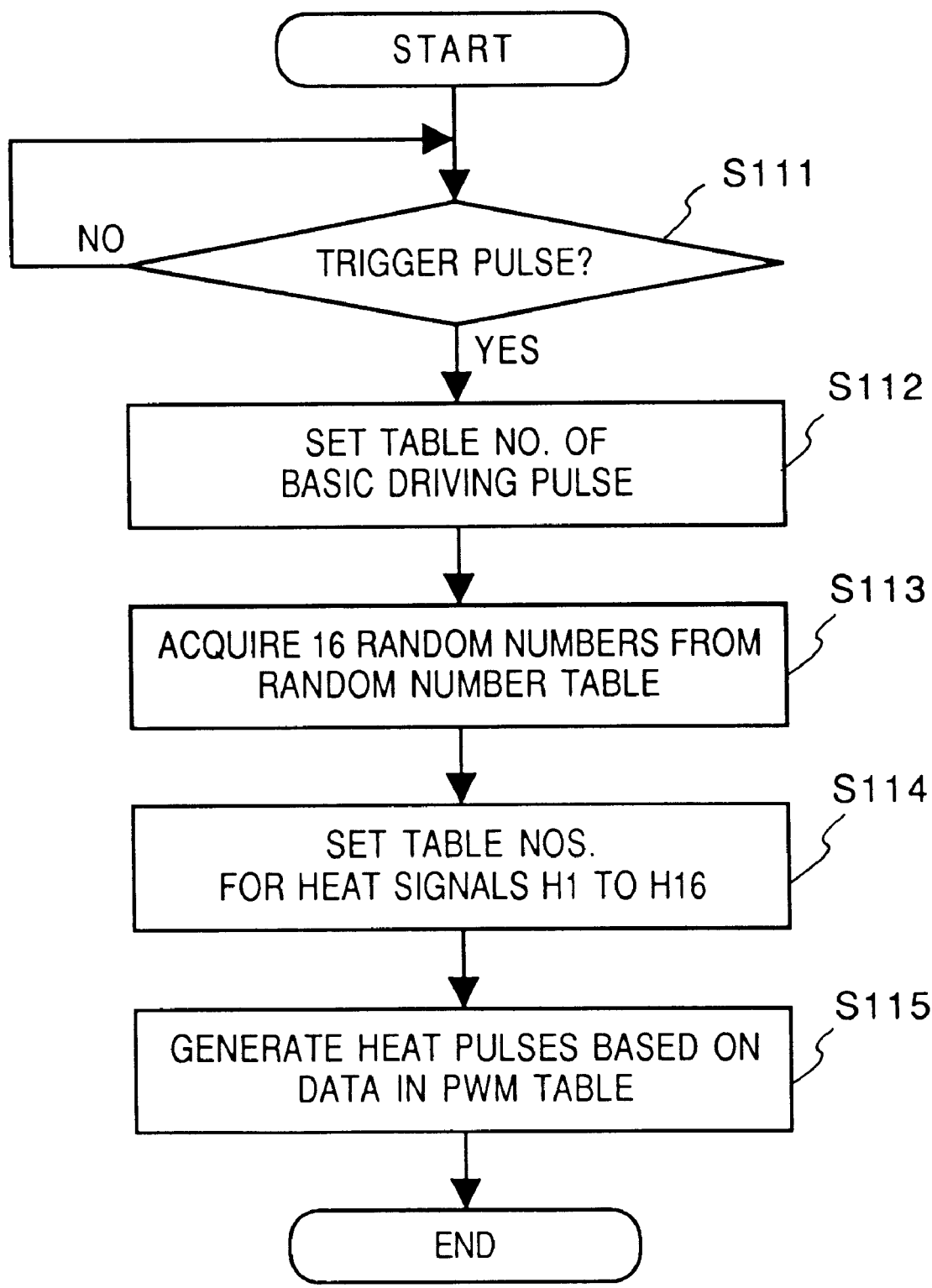
FIG. 28 is a flow chart showing the determination sequence of a heat pattern in the fourth embodiment.

In the fourth embodiment, heat pattern determination control for randomly modulating the ink dot size to be ejected to improve image quality, and for determining energy to be applied to each ejection heater to shorten the total control time for randomization as much as possible is executed. The determination control will be described below with reference to FIG. 28. FIG. 28 is a flow chart showing the heat pattern determination sequence of the fourth embodiment.

When the trigger pulse generated at a 6-kHz interval is input to the gate array 1704, a basic driving pulse at that time is set in the gate array 1704 (steps S111 and S112). In this embodiment, an optimal basic driving pulse corresponding to the temperature of the recording head is set by the MPU 1701, and is stored in the basic driving table NO. setting register 227. Note that the basic driving pulse may have a fixed value in correspondence with a recording head. The basic driving table NO. setting register 227 stores not the ON/OFF pulse width itself but a table number in the PWM table 228 in which various pulse patterns are registered in advance.

In the PWM table 228, 16 different pulse patterns having table numbers 1 to 16 are registered, and as the table number is smaller, a pulse for defining a smaller ejection amount is set. More specifically, when the table number is different by 1, the ejection amount is increased/decreased by 1 ng. For example, immediately after a high-duty printing operation is continuously performed, since the temperature of the recording head is high, the ejection amount becomes relatively large. In order to correct this, the MPU 1701 sets the basic driving pulse to decrease the ejection amount.

Note that various kinds of ejection amount correction control corresponding to the temperature of the recording head have been developed in addition to the above-mentioned method, and this embodiment may adopt any correction means. Also, a recording head which does not perform correction control may be used.

A method of setting heat conditions to be set on the heat signals will be described below. The driving pulse is set, so that the heat condition to be set on each heat signal, i.e., the ejection amount of each nozzle varies on the average with respect to the ejection amount obtained when the nozzle is driven by the basic driving pulse. As described above, since the PWM table 228 is set to modulate the ejection amount at equal intervals, the table number is increased/decreased from the table number set in the basic driving table NO. setting register 227 at a uniform generation probability to apply a pulse to each heat signal line. In order to uniformly increase/decrease the basic table number, random numbers are generated to have zero as the central value, and are added to the basic table number to generate a heat signal to each heat signal line.

The recording head has the 128 nozzles, and is driven at 6 kHz. For this reason, at least 128 random number generation calculations and 128 PWM value setting operations must be repetitively performed during an interval of 166 μs. Normally, the MPU time-divisionally processes a function of controlling a printer engine (such as interrupt processing for heats, interrupt processing for driving the motor, and the like) and a function as a controller for interpreting a print command and developing it into recording data during the printing operation. In recent years, upon development of high-speed recording apparatuses, the processing capacity per unit time of the MPU has remarkably increased.

When the processing overflows during a printing operation in which processing operations are concentrated on the MPU, since the recording apparatus is active, the above-mentioned engine function cannot be neglected. Therefore, the MPU interrupts the controller function, and controls the above-mentioned division processing so as not to cause an erroneous operation of the recording apparatus. However, to interrupt the control function is to interrupt development of print data for the next line. Therefore, after the current line is printed, the operation of the recording apparatus stands by until development of the print data for the next line is finished. For this reason, the print speed per line may be very high, but the print time per page cannot be shortened very much.

In the future, it is apparent that the operation speed of the recording apparatus will further increase, and how to increase the processing speed of the basic function as the recording operation and how to decrease the MPU occupation rate in additional processing are the most important problems to be solved to realize a high-speed apparatus in the future.

The random dot control for modulating the dot size in units of dots to be printed is effective for improving image quality. On the analogy of the expected development of future recording apparatuses, it is easy to assume that the random dot control will be difficult to realize in terms of the limitations on the processing time. In this embodiment, the processing time of the random dot control is shortened, as will be described below.

In the random dot control according to the fourth embodiment, random numbers for randomly modulating the dot size are calculated in advance, and are stored in a DRAM 1703 in the form of a table (random number table 231). The random number value is read out from the DRAM 1703 to the gate array, as needed (step S113). Note that the read-out operation of the random number value is achieved by a DMA (direct memory access) function of the gate array 1704. In normal random dot control, a heat pulse must be generated by executing further processing of the random number value. However, in this embodiment, the heat pulse is generated using the PWM table 228 arranged in the gate array 1704. Since the PWM table 228 is set to change the ejection amount by a predetermined amount in units of table numbers, a table NO. corresponding to each nozzle is obtained by adding the random number value read out from the random number table 231 to the basic driving table number which is set in advance by the MPU 1701, thus allowing random dot size control (step S114). Pulse formation information in the PWM 228 is acquired on the basis of the table number obtained in step S114, and a heat pulse is generated (step S115).

In this embodiment, the random number table is a numerical value table which is randomized within a ±3 range having 0 as the central value. More specifically, the dot size is controlled to be randomly modulated within the modulation width of an ejection amount of ±3 ng to have the basic driving pulse as the center, with which an optimal ejection amount is obtained in the state of the recording head in consideration of the current temperature rise of the recording head, and the like. Since the recording head of this embodiment has 16 nozzles per block, 16 random numbers must be read for executing the printing operation for one block.

In the fourth embodiment, there are seven random numbers within a ±3 range, as described above, and one random number value is stored using 3 bits. Therefore, 48 bits (3 bits×16 nozzles), i.e., values corresponding to a 3-word length, are read out for the printing operation per block. When the MPU 1701 used in this embodiment is, e.g., a 16-bit CPU, random numbers for the 16 nozzles can be acquired by three accesses. Furthermore, the gate array 1704 has a function of generating an address required for the gate array 1704 itself and accessing the DRAM 1703 while the MPU 1701 accesses the ROM 1702. For this reason, the MPU occupation rate required for reading out the random numbers on the gate array is substantially zero. After the random number values are input to the gate array 1704, pulses to be supplied to the heat signal lines can be set by the above-mentioned simple addition processing. As described above, the random dot size modulation control can be realized by very simple processing.

The random number table may be a table on which numerical values are irregularly set forth, or may be a random number table locally having periodicity within a range in which visually observable periodicity is not generated.

In this embodiment, the random number table stored in the ROM 1702 is developed on the DRAM 1703 to execute control. However, the present invention is not limited to this. For example, a random number table may be allocated in advance in the ROM 1702, and the gate array 1704 may directly access the ROM 1702.

In this embodiment, the PWM table 228 is set to modulate the ejection amount at equal intervals. However, the present invention is not limited to this. For example, the PWM table may be set to proportionally increase the ejection amount or may be set to have a less strict increase tendency within a range free from disruption in control.

According to the fourth embodiment, the random number table 231 for storing random numbers calculated in advance in the form of a table, and the PWM table 228 for storing driving pulse patterns in the form of a table are used, and the gate array 1704 has a DMA (direct memory access) function of generating an address for accessing the random number table 231 to acquire data from the random number table 231 without troubling the MPU 1701. Furthermore, the addition processing of the random number value and the basic driving table NO. is executed by the gate array 1704. For this reason, the MPU 1701 need only set the basic driving table NO. to acquire table NOs. used for the heat signals, i.e., randomized heat pulses. In this manner, the load on the MPU upon realization of the random dot control can be remarkably reduced.

As described above, according to the fourth embodiment, an increase in required processing capacity as an adverse effect of the random dot control, i.e., an increase in load on the MPU can be prevented while assuring an effect of eliminating a density nonuniformity such as a white stripe, a black stripe, and the like on a recorded image.

Figure 29:
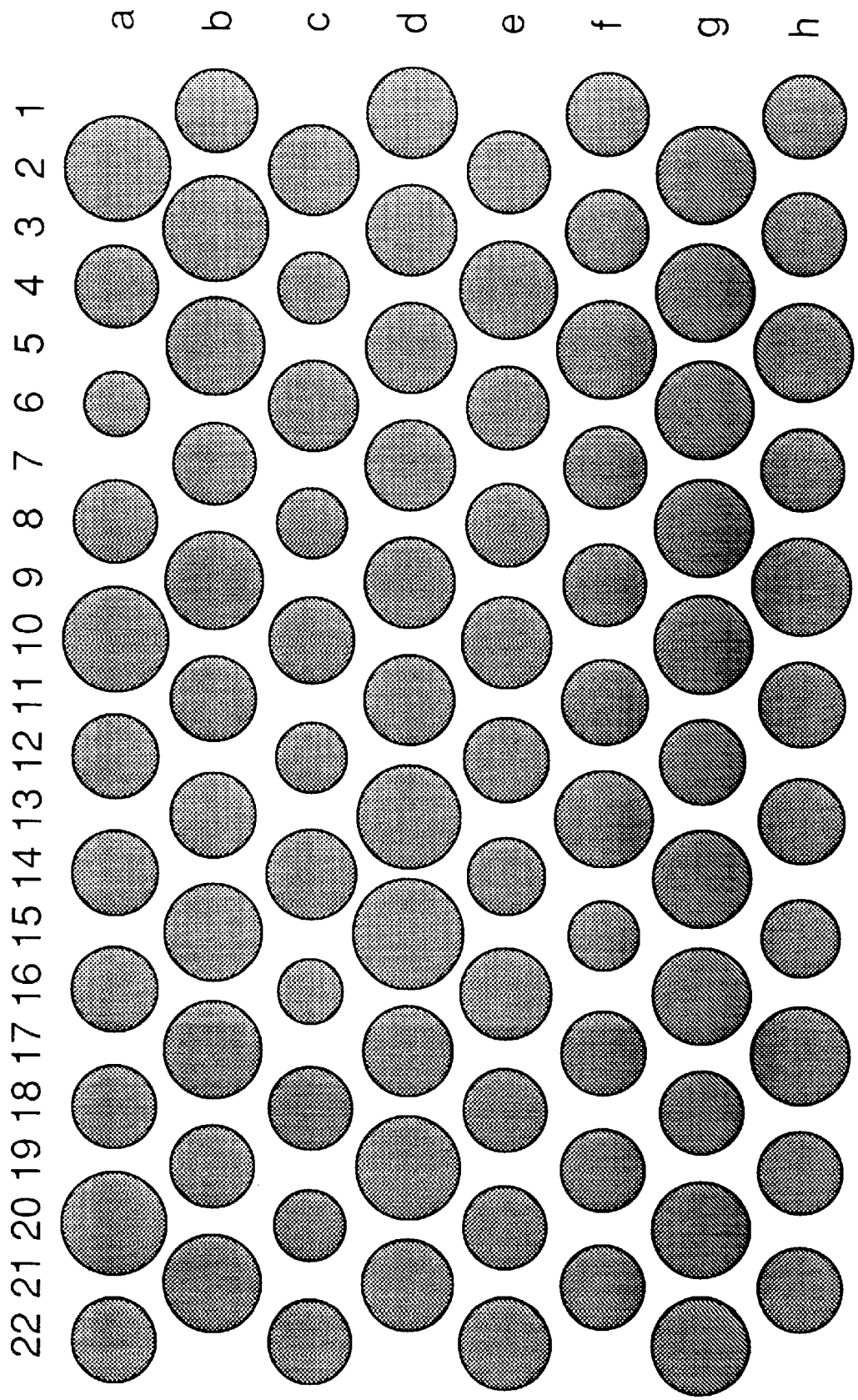
FIG. 29 is a view illustrating a recorded image obtained when irregular dot size modulation is executed in units of blocks.

In the above-mentioned embodiment, the dot size is modulated in units of nozzles in each block. However, the dot size may be modulated in units of blocks or in units of columns of a recording head 1. However, deterioration (e.g., a low image quality caused by texture-like regularity) of quality of a recorded image can be eliminated more effectively by modulating the dot size in units of nozzles even in a single block like in this embodiment. As described above, FIG. 6 is a view showing the result of the above-mentioned irregular dot size modulation in units of columns. On the other hand, FIG. 29 is a view showing the result of dot size modulation in units of nozzles according to this embodiment. As can be seen from FIGS. 6 and 29, a uniform image can be obtained by the dot size modulation in units of nozzles as compared to that in units of columns, and image quality can be improved.

<Fifth Embodiment>

A recording apparatus which can further improve image quality in the random dot control of the fourth embodiment will be explained below.

In the fourth embodiment, one random number table is used as the dot size modulation means. In the fifth embodiment, a plurality of random number tables are used. In the fourth embodiment, random numbers are calculated in advance, and are stored in the form of a table, thereby greatly shortening the processing time as compared to a case wherein random numbers are calculated for each printing operation. However, periodicity may appear in a recorded image when this random number table is repetitively used, and may cause a nonuniformity. In order to solve this problem, the capacity of the memory for storing the random number table may be sufficiently increased. However, it is often difficult to take such a countermeasure in terms of cost (for example, a memory capacity of about 2.6 Mbits is required to store random numbers for five lines, which numbers require 3 bits per information, in a recording apparatus having a resolution of 360 DPI).

The fifth embodiment can solve the above-mentioned problem, and eliminates the above-mentioned regularity by randomly selectively using a plurality of random number tables. For example, five 200-Kbit random number tables (each corresponding to random numbers for about ⁴⁄₁₀ lines in a recording apparatus having a resolution of 360 DPI and requiring 3 bits per information) are prepared, and are randomly and selectively used.

With the above-mentioned control, the periodicity of the random number table can be theoretically eliminated. As a result, a recording apparatus, which can suppress a periodic nonuniformity generated on a recorded image, can attain high quality of an output image and high processing speed, and can prevent a considerable increase in memory capacity even when the random dot control is executed using random number table means with a small control load, can be realized.

Figure 30:
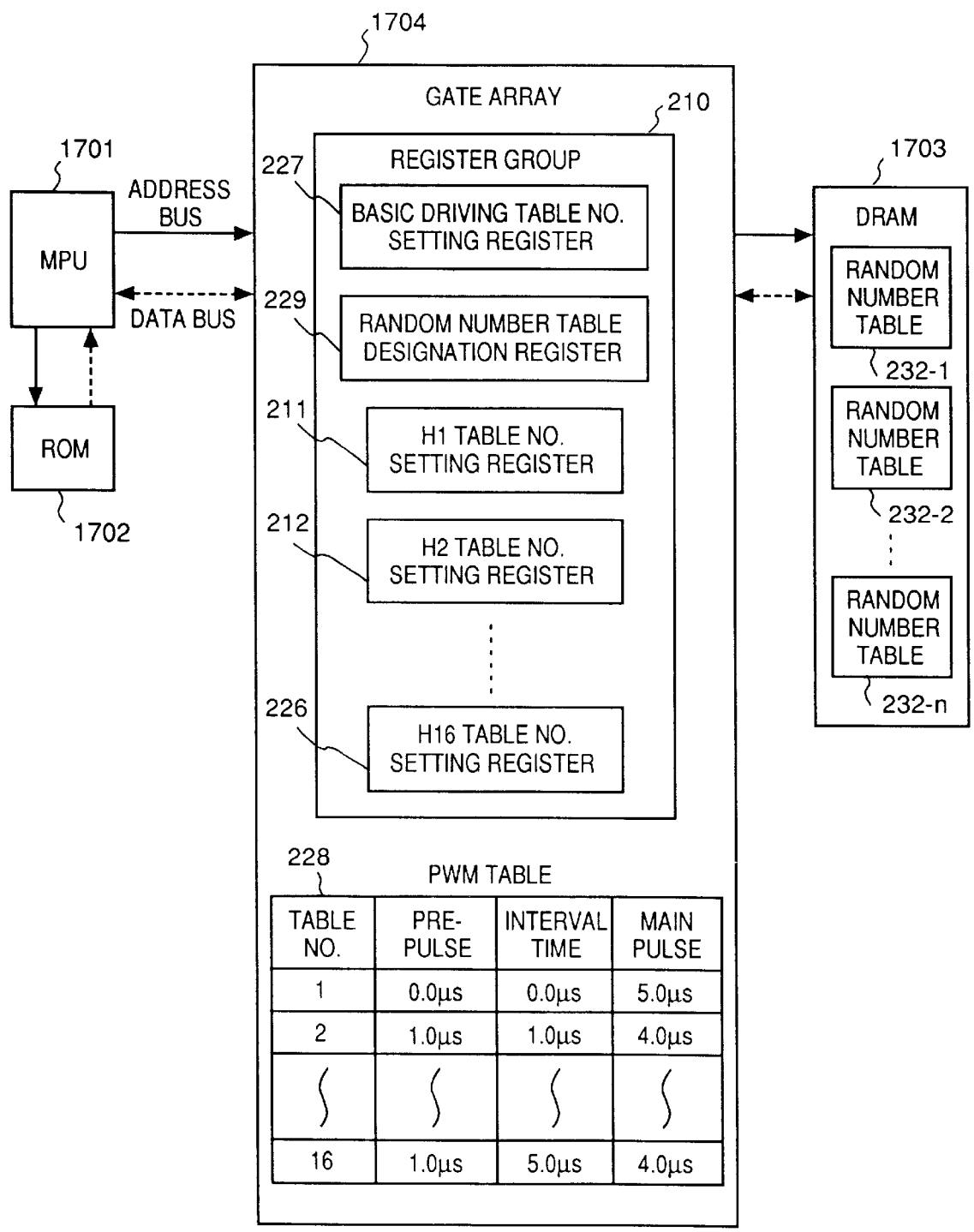
FIG. 30 is a block diagram showing the control arrangement for realizing random dot control according to the fifth embodiment of the present invention.

The random dot control of the fifth embodiment will be described below with reference to FIG. 30. FIG. 30 is a block diagram showing the control arrangement for realizing the random dot control of the fifth embodiment. The same reference numerals in FIG. 30 denote the same parts as in the fourth embodiment, and a detailed description thereof will be omitted. This embodiment comprises the arrangement for randomly modulating the dot size of an ink to be ejected so as to improve image quality, and for shortening the total control time for the randomization as much as possible as in the fourth embodiment. The arrangement for shortening the random dot control is the same as that in the fourth embodiment. More specifically, this embodiment comprises the random number table for storing random number values calculated in advance in the form of a table, and the PWM table for holding driving pulse patterns in the form of a table. The pulse patterns in the PWM table are set to change the ejection amount by a predetermined amount. The gate array has a DMA function of generating an address for accessing the random number table to acquire random number data without troubling the MPU.

In the fifth embodiment, the DRAM 1703 stores a plurality of random number tables 232-1 to 232-n. Reference numeral 229 denotes a random number table designation register, which is one of the register group 210 of the gate array 1704, and stores information for designating one to be used of the random number tables stored in the DRAM 1703.

Figure 31:
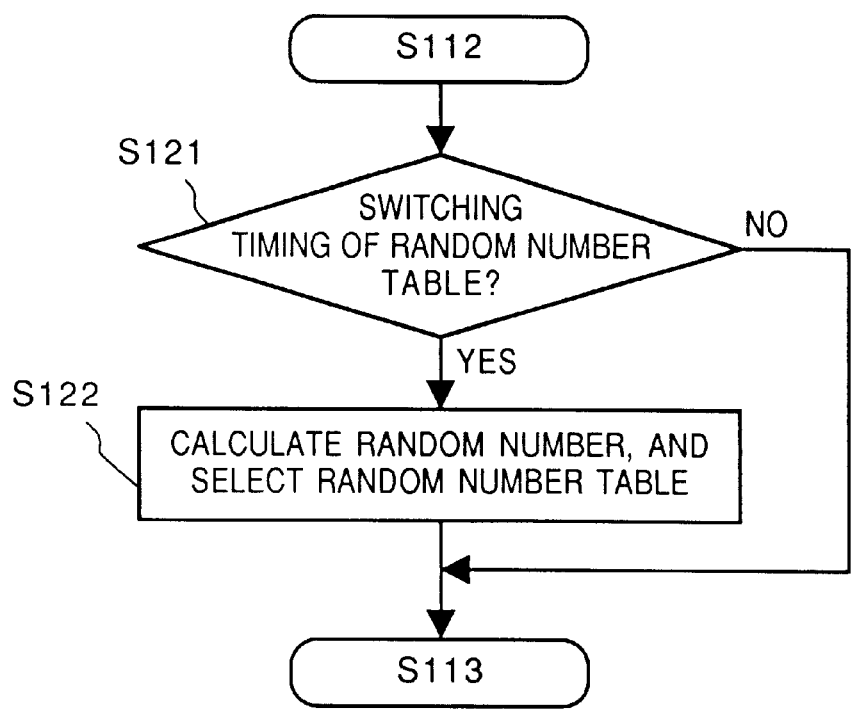
FIG. 31 is a flow chart showing the characteristic sequence of the random dot control in the fifth embodiment.

FIG. 31 is a flow chart showing the characteristic sequence of the random dot control of the fifth embodiment, and shows processing to be executed between steps S112 and S113 in the flow chart of the fourth embodiment. It is checked in step S121 if the current timing is a switching timing of the random number table. If YES in step S121, the flow advances to step S122 to switch the random number table to be used. As a method of randomly selecting the random number table, the MPU 1701 or the gate array 1704 calculates a random number for selecting the random number table at the switching timing of the random number table (e.g. the end timing of the current random number table), and stores the calculation result in the random number table designation register 229. In this case, according to this embodiment, since a calculation is performed at a time interval between 100 to 200 msec, the processing load does not become large. A random number table selection table for randomly selecting the random number table may be prepared, and information of the next random number table to be used may be acquired from the random number table selection table at the switching timing of the random number table.

As described above, since a plurality of random number tables are arranged and are randomly selectively used, a recording apparatus, which can further eliminate a density nonuniformity such as a white stripe, a black stripe, and the like on a recorded image, and can suppress increases in processing time and required memory capacity as adverse effects of the random dot control, can be realized.

Since the arrangement and control other than random number table selection means are the same as those in the fourth embodiment, a detailed description thereof will be omitted.

<Sixth Embodiment>

In the sixth embodiment, an arrangement for controlling the modulation width of a dot size to be randomized in the random dot control will be described below.

In each of the above embodiments, the modulation width of a dot size to be randomized is fixed for each recording apparatus. However, as described above, noise may often appear in an image in the random dot control. The noise tends to increase almost in proportion to the modulation width of a dot size to be randomized. On the contrary, a [white stripe] or [black stripe] nonuniformity on an image is eliminated in inverse proportion to the modulation width. Therefore, the modulation width of a dot size to be randomized is normally set to be a maximum modulation width which does not cause conspicuous noise. However, such noise depends on a user's favor. That is, some users do not mind slight noise, while some others sensitively hate it.

The sixth embodiment can cope with a difference in user's favor. Since the control arrangement of the sixth embodiment is the same as that in the fifth embodiment, a detailed description thereof will be omitted. However, a plurality of random number tables have different variation levels, and each random number table is designed to regulate the modulation width of a dot size in accordance with the selected random number table. Furthermore, the random number table designation register 229 stores information for designating a random number table which is determined to be used on the basis of the set modulation width.

For example, the sixth embodiment has five different random number tables, which are respectively designed to have random number variation ranges of ±1, ±2, ±3, ±4, and ±5. More specifically, values 0, 1, and 2 are randomly arranged in the random number table having the variation range of ±1. A PWM table number selected by 1 as the central value is one stored in the basic driving table NO. setting register, and a corresponding driving signal is applied. When 0 is selected, 1 is decreased from the basic driving table number, and the driving operation is performed under the condition of the PWM table decreased by one unit. On the other hand, when a random number, 2, is selected, 1 is added to the basic driving table number, and the driving operation is performed under the condition of the PWM table increased by one unit.

Since a user can select an optimal one of the above-mentioned tables, an optimal variation range depending on the user's favor or the type of an output image to be produced can be controlled to a desired range.

Figure 32:
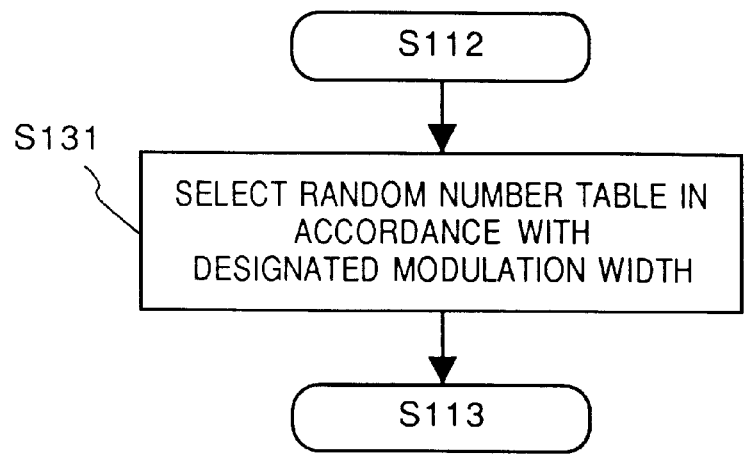
FIG. 32 is a flow chart showing the characteristic sequence of the random dot control in the sixth embodiment of the present invention.
Figure 33:
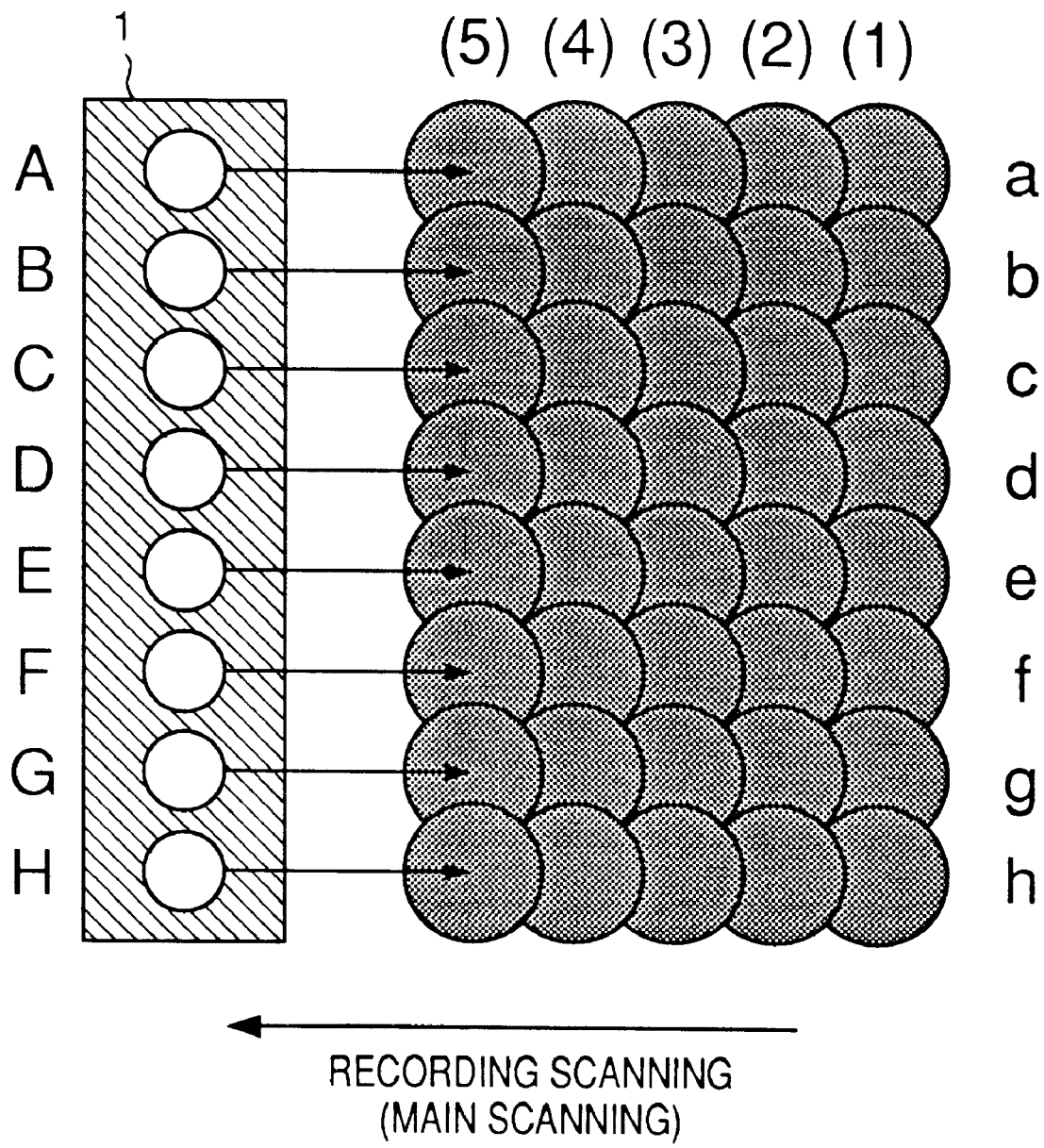
FIG. 33 is a view for explaining a conventional recording head and a dot formation state.
Figure 34:
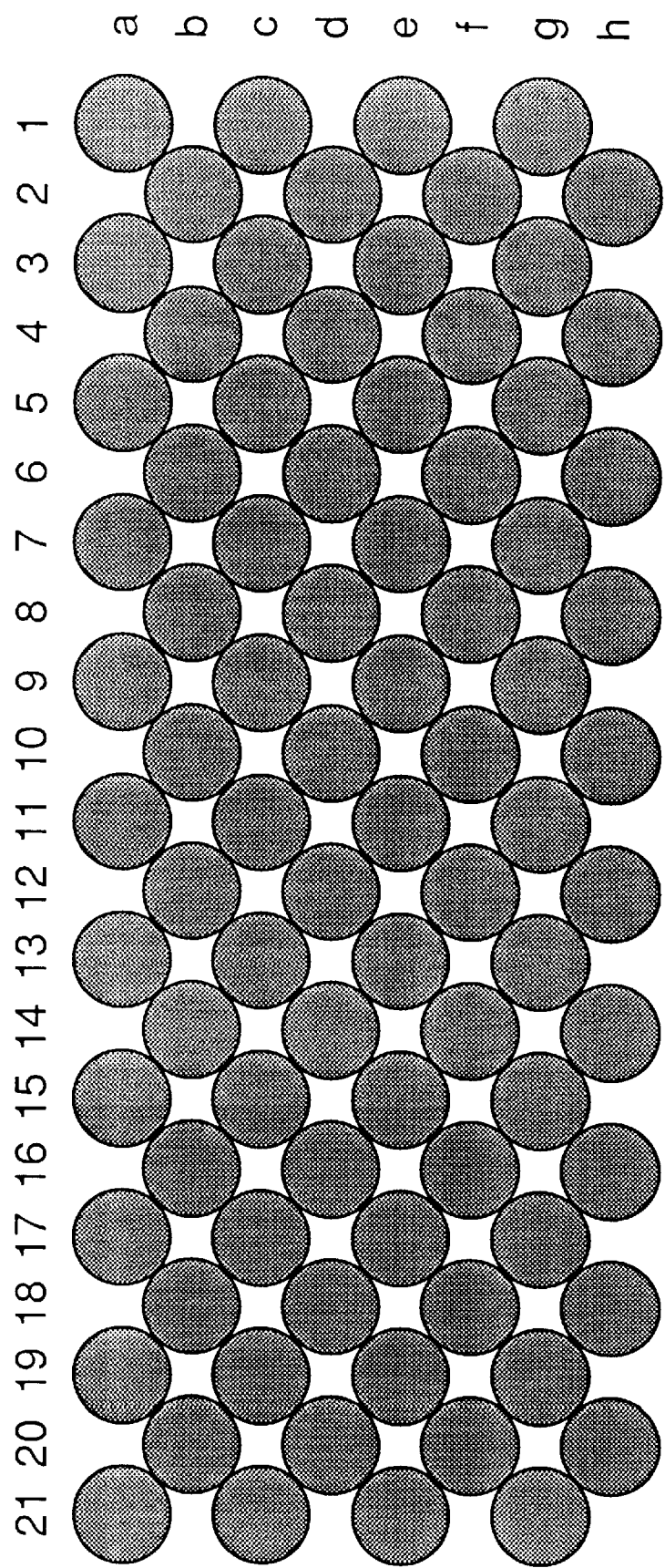
FIG. 34 is a view showing a recorded image obtained by recording dots with uniform areas at accurate positions on the basis of basic 50%-halftone image information.

FIG. 32 is a flow chart showing the characteristic sequence of the random dot control of the sixth embodiment, and shows the sequence to be executed between steps S112 and S113 in the flow chart shown in FIG. 28. In step S131, the random number table to be used is determined with reference to the random number table designation register 229.

As a method of setting a desired random number variation range, a method of setting the range on the basis of a command from an external apparatus such as a host computer, a method of setting the range using switches such as panel switches or dip switches, or a method as a combination of the above-mentioned methods may be used as long as the setting information can be transmitted to the recording apparatus. Since means for transmitting information to the recording apparatus is a very rudimentary known technique, a detailed description thereof will be omitted.

Since the arrangement and control other than selection control means for a desired random number table are the same as those in the above embodiment, a detailed description thereof will be omitted.

As described above, according to the sixth embodiment, the modulation width of a dot size in the random dot control can be set. For this reason, the modulation width of the dot size can be designated in correspondence with an individual difference in responding to noise or conspicuousness of noise in an image, thus efficiently suppressing the noise.

As described above, according to the above embodiments, the load on the MPU upon execution of the random dot control can be reduced.

Furthermore, noise formed by the random dot control can be eliminated while reducing the load on the MPU upon execution of the random dot control.

In each of the first, second, fourth, fifth, and sixth embodiments, the dot area modulation means is used. As this means, dot area modulation means based on a pre-pulse, an application voltage, or a combination thereof may be used.

The present invention brings about excellent effects particularly in a recording head and a recording apparatus adopting an ink-jet system for performing recording by forming flying ink droplets utilizing heat energy, among ink-jet recording systems.

As the representative arrangement and principle of the ink-jet recording system, one practiced by use of the basic principle disclosed in, for example, U.S. Pat. Nos. 4,723,129 and 4,740,796 is preferred. The above system is applicable to either one of so-called an on-demand type and a continuous type. Particularly, in the case of the on-demand type, the system is effective because, by applying at least one driving signal, which corresponds to recording information and gives a rapid temperature rise exceeding nucleus boiling, to each of electro-thermal energy conversion elements arranged in correspondence with a sheet or liquid channels holding liquid (ink), heat energy is generated by the electro-thermal conversion element to effect film boiling on the heat acting surface of the recording head, and consequently, a bubble can be formed in the liquid (ink) in one-to-one correspondence with the driving signal. By ejecting the liquid (ink) through an ejection orifice by growth and shrinkage of the bubble, at least one droplet is formed. If the driving signal is applied as a pulse signal, the growth and shrinkage of the bubble can be attained instantly and adequately to achieve ejection of the liquid (ink) with the particularly high response characteristics.

As the pulse driving signal, signals disclosed in U.S. Pat. Nos. 4,463,359 and 4,345,262 are suitable. Note that further excellent recording can be performed by using the conditions described in U.S. Pat. No. 4,313,124 of the invention which relates to the temperature rise rate of the heat acting surface.

As an arrangement of the recording head, in addition to the arrangement as a combination of ejection orifices, liquid channels, and electro-thermal energy conversion elements (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention.

In addition, the present invention can be effectively applied to an arrangement based on Japanese Patent Laid-Open No. 59-123670 which discloses the arrangement using a common slit as an ejection portion of electro-thermal energy conversion elements, or Japanese Patent Laid-Open No. 59-138461 which discloses the arrangement having an opening for absorbing a pressure wave of heat energy in correspondence with an ejection portion.

Furthermore, as a full line type recording head having a length corresponding to the width of a maximum recording medium which can be recorded by the recording apparatus, either the arrangement which satisfies the full-line length by combining a plurality of recording heads as disclosed in the above specification or the arrangement as a single recording head obtained by forming recording heads integrally can be used.

In addition, the present invention is effective for a case using an exchangeable chip type recording head which can be electrically connected to the apparatus main body or can receive an ink from the apparatus main body upon being mounted on the apparatus main body, or a cartridge type recording head in which an ink tank is integrally arranged on the recording head itself.

It is preferable to add recovery means for the recording head, preliminary auxiliary means, and the like provided as an arrangement of the recording apparatus of the present invention since the effect of the present invention can be further stabilized. Examples of such means include, for the recording head, capping means, cleaning means, pressurization or suction means, and preliminary heating means using electro-thermal energy conversion elements, another heating element, or a combination thereof. It is also effective for stable recording to execute a preliminary ejection mode which performs ejection independently of recording.

Furthermore, as a recording mode of the recording apparatus, the present invention is extremely effective for not only an apparatus having a recording mode using only a primary color such as black or the like, but also an apparatus having at least one of a multi-color mode using a plurality of different colors or a full-color mode achieved by color mixing, although such modes may be attained either by using an integrated recording head or by combining a plurality of recording heads.

Moreover, in the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink-jet system so that the ink viscosity can fall within a stable ejection range.

In addition, a temperature rise caused by heat energy may be prevented by positively utilizing the temperature rise as energy for a change in state from a solid state to a liquid state of the ink, or an ink which is solidified in a non-use state for the purpose of preventing evaporation of the ink may be used. In any case, the present invention can be applied to a case wherein an ink, which can be liquefied by heat energy such as an ink which is liquefied upon application of heat energy according to a recording signal, and is ejected in a liquid state, an ink which begins to be solidified when it reaches a recording medium, or the like may be used. In this case, an ink may be held in a liquid or solid state in recess portions or through holes of a porous sheet, as described in Japanese Patent Laid-Open No. 54-56847 or 60-71260, and the porous sheet may be arranged to oppose electrothermal converting elements. In the present invention, the above-mentioned film boiling system is most effective for the above-mentioned inks.

In addition, the recording apparatus of the present invention may be one integrally or separately arranged as an image output terminal of an information processing equipment such as a wordprocessor, a computer, or the like, or a copying machine as a combination with a reader, and the like, or a facsimile apparatus having a transmission/reception function.

In each of the above embodiments, a recording head adopting an ink-jet system using heat energy has been described. However, the present invention may be applied to recording apparatuses adopting other ink-jet systems, a thermal transfer system, and the like. In particular, in the thermal transfer system, the basic operation and effect are the same as those of the inkjet system although "the density of a recording dot" replaces "the size of a recording dot" in each of the above embodiments.

In the present invention, the words "random" and "random numbers" include pseudo-random or pseudo-random numbers respectively. That is, a meaning of "random" in the present invention includes mere irregularity.

Note that the present invention may be applied to either a system constituted by a plurality of devices or an apparatus consisting of a single device. Needless to say, the present invention can be applied to a case wherein the invention is achieved by supplying a program for executing processing defined by the present invention to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. A recording apparatus for recording an image based on image data using a recording head, comprising:

storage means for storing a plurality of instruction data for instructing an execution order of a plurality of types of driving patterns of said recording head, the plurality of instruction data instructing different execution orders;

selection means for randomly selecting the plurality of instruction data stored in said storage means one by one upon recording of the image, said selection means selecting the plurality of instruction data independently from the image data; and driving means for driving said recording head based on the image data while sequentially changing the driving patterns of said recording head in accordance with the execution order instructed by the instruction data selected by said selection means.

2. The apparatus according to claim 1, wherein said storage means stores n! instruction data each for instructing the execution order of n driving patterns, and the n! instruction data instruct different execution orders.

3. The apparatus according to claim 1, wherein said selection means calculates a random number, and selects one of the plurality of instruction data stored in said storage means on the basis of the calculated random number.

4. The apparatus according to claim 1, wherein a plurality of recording elements of said recording head are arranged in a sub-scanning direction substantially perpendicular to a recording scanning direction of said recording head, and said driving means drives said recording head while sequentially changing the driving patterns in accordance with the execution order instructed by the selected instruction data in units of time-divisional recording operations of the plurality of recording elements.

5. The apparatus according to claim 1, wherein the driving pattern controls a size of dots recorded by a plurality recording elements of said recording head.

6. The apparatus according to claim 5, wherein said recording head comprises an ink-jet recording head for performing recording by ejecting an ink.

7. The apparatus according to claim 6, wherein said recording head comprises a recording head for ejecting the ink by utilizing heat energy, and comprises a heat energy conversion element for generating heat energy to be applied to the ink.

8. The apparatus according to claim 7, wherein said recording head causes a change in state in the ink by heat energy applied by said heat energy conversion element, and ejects the ink from an ejection orifice on the basis of the change in state.

9. The apparatus according to claim 8, wherein the size of the dots defined by the driving pattern is controlled by an application interval between a pre-heat pulse for pre-heating said heat energy conversion element and a main pulse for causing said heat energy conversion element to perform actual ink ejection.

10. The apparatus according to claim 1, wherein the driving pattern controls a density of dots recorded by a plurality of recording elements of said recording head.

11. The apparatus according to claim 10, wherein said recording head comprises a recording head for performing thermal recording.

12. A recording apparatus for recording an image based on image data using a recording head, comprising:

first storage means for storing a plurality of instruction data for instructing an execution order of a plurality of types of driving patterns of said recording head, the plurality of instruction data instructing different execution orders;

second storage means for storing order information for instructing an extraction order of the plurality of instruction data, the extraction order being random and independent from the image data to be recorded;

extraction means for extracting the plurality of instruction data from said first storage means one by one based on the order information stored in said second storage means upon recording of the image; and driving means for driving said recording head based on the image data while sequentially changing the driving patterns of said recording head in accordance with the execution order instructed by the instruction data extracted by said extraction means.

13. The apparatus according to claim 12, wherein said first storage means stores n! instruction data indicating the execution orders of n driving patterns, and the n! instruction data instruct different execution orders, and said second storage means stores the order information consisting of (n!)! order data indicating extraction orders of the n! instruction data, and the (n!)! order data represent different extraction orders.

14. The apparatus according to claim 12, wherein a plurality of recording elements of said recording head are arranged in a sub-scanning direction substantially perpendicular to a recording scanning direction of said recording head, and said driving means drives said recording head while sequentially switching the driving patterns in accordance with the execution order instructed by the extracted instruction data in units of time-divisional recording operations at the plurality of recording elements.

15. The apparatus according to claim 12, wherein the order information stored in said second storage means corresponds to substantially two scans of said recording head, and is set to define opposite driving states of recording elements of said recording head in first and second scan portions of the order information.

16. The apparatus according to claim 12, wherein the driving pattern controls a size of dots recorded by the plurality recording elements.

17. The apparatus according to claim 16, wherein said recording head comprises an ink-jet recording head for performing recording by ejecting an ink.

18. The apparatus according to claim 17, wherein said recording head comprises a recording head for ejecting the ink by utilizing heat energy, and comprises a heat energy conversion element for generating heat energy to be applied to the ink.

19. The apparatus according to claim 18, wherein said recording head causes a change in state in the ink by heat energy applied by said heat energy conversion element, and ejects the ink from an ejection orifice on the basis of the change in state.

20. The apparatus according to claim 19, wherein the size of the dots defined by the driving pattern is controlled by an application interval between a pre-heat pulse for pre-heating said heat energy conversion element and a main pulse for causing said heat energy conversion element to perform actual ink ejection.

21. The apparatus according to claim 12, wherein the driving pattern controls a density of dots recorded by a plurality of recording elements of said recording head.

22. The apparatus according to claim 21, wherein said recording head comprises a recording head for performing thermal recording.

23. A recording apparatus for recording an image based on image data using a recording head, comprising:

first storage means for storing instruction data each for instructing a corresponding one of a plurality of driving patterns of said recording head in an order which is random and independent from image data to be recorded;

second storage means for storing control information corresponding to each of the plurality of types of driving patterns; and driving means for acquiring the control information corresponding to the instruction data sequentially read out from said first storage means and driving said recording head based on the image data while changing the driving patterns of said recording head on the basis of the control information.

24. The apparatus according to claim 23, wherein said first storage means stores random numbers, which are generated in advance, as the instruction data respectively representing the plurality of driving patterns.

25. The apparatus according to claim 24, further comprising:

setting means for selecting a standard driving pattern from the plurality of driving patterns on the basis of a use state of said recording head, and setting a correspondence between the random number values and the driving patterns so that the selected driving pattern corresponds to a central value of a change range of the random numbers stored in said first storage means, and wherein said driving means acquires the control information in accordance with the correspondence set by said setting means on the basis of the random number values sequentially read out from said first storage means, and drives said recording head on the basis of the acquired control information.

26. The apparatus according to claim 24, wherein said recording head comprises an ink-jet recording head for performing recording by ejecting an ink.

27. The apparatus according to claim 26, wherein said recording head comprises a recording head for ejecting the ink by utilizing heat energy, and comprises a heat energy conversion element for generating heat energy to be applied to the ink.

28. The apparatus according to claim 27, wherein said recording head causes a change in state in the ink by heat energy applied by said heat energy conversion element, and ejects the ink from an ejection orifice on the basis of the change in state.

29. The apparatus according to claim 28, wherein said second storage means stores the control information for controlling an ejection amount of the ink from recording elements of said recording head.

30. The apparatus according to claim 24, wherein a plurality of recording elements of said recording head are driven while being divided into a plurality of blocks upon recording of the image, and said driving means reads out the instruction data corresponding in number to the plurality of blocks from said first storage means, acquires the control information corresponding to the readout instruction data, and drives said recording head while changing the driving patterns in units of blocks on the basis of the control information.

31. The apparatus according to claim 24, wherein said recording head comprises an ink-jet recording head for performing recording by ejecting an ink.

32. The apparatus according to claim 31, wherein said recording head comprises a recording head for ejecting the ink by utilizing heat energy, and comprises a heat energy conversion element for generating head energy to be applied to the ink.

33. The apparatus according to claim 32, wherein said recording head causes a change in state in the ink by heat energy applied by said heat energy conversion element, and ejects the ink form an ejection orifice on the basis of the change in state.

34. The apparatus according to claim 33, wherein said second storage means stores the control information for controlling an ejection amount of the ink from recording elements of said recording head.

35. A recording apparatus for recording an image based on image data using a recording head, comprising:

first storage means for storing a plurality of different tables each for storing instruction data and instructing a corresponding one of a plurality of types of driving patterns of said recording head in an order which is random and independent from the image data to be recorded;

second storage means for storing control information corresponding to each of the plurality of types of driving patterns;

selection means for randomly and independently of the image data, selecting one of the tables stored in said first storage means upon recording of the image; and driving means for acquiring, from said second storage means, the control information corresponding to the instruction data sequentially read out from the selected table, and driving said recording head based on the image data while changing the driving patterns of said recording head on the basis of the control information.

36. The apparatus according to claim 35, wherein each of the tables of said first storage means stores random numbers, which are generated in advance, as the instruction data respectively representing the plurality of types of driving patterns.

37. The apparatus according to claim 36, further comprising:

setting means for selecting a standard driving pattern from the plurality of types of driving patterns on the basis of a use state of said recording head, and setting a correspondence between the random number values and the driving patterns so that the selected driving pattern corresponds to a central value of a change range of the random numbers stored in said first storage means, and wherein said driving means acquires the control information in accordance with the correspondence set by said setting means on the basis of the random number values sequentially read out from the selected table, and drives said recording head on the basis of the acquired control information.

38. The apparatus according to claim 35, wherein a plurality of recording elements of said recording head are driven while being divided into a plurality of blocks upon recording of the image, and said driving means reads out the instruction data corresponding in number to the plurality of blocks from the selected table, acquires the control information corresponding to the readout instruction data, and drives said recording head while changing the driving patterns in units of blocks on the basis of the control information.

39. The apparatus according to claim 35, wherein said selection means stores random numbers, which are generated in advance, as data indicating the plurality of tables stored in said first storage means, and selects the table on the basis of the random number upon recording of the image.

40. The apparatus according to claim 35, wherein said selection means selects the table when all the instruction data stored in the currently selected table are read out by said driving means.

41. A recording apparatus for recording an image based on image data using a recording head, comprising:

first storage means for storing a plurality of different random number tables for storing random numbers which are generated to have different numerical value ranges, an order of the random number being independent from image data to be recorded;

second storage means for storing control information corresponding to each of a plurality of driving patterns of said recording head;

designation means for designating a change range of the driving pattern;

selection means for selecting one of the random number tables stored in said first storage means on the basis of the change range designated by said designation means; and driving means for acquiring the control information from said second storage means on the basis of the random numbers sequentially read out from the selected random number table and driving the recording head based on the image data while changing the driving patterns of the recording head on the basis of the control information.

42. The apparatus according to claim 41, further comprising:

setting means for selecting a standard driving pattern from the plurality of driving patterns on the basis of a use state of said recording head, and setting a correspondence between the random number values and the driving patterns so that the selected driving pattern corresponds to a central value of a change range of the random numbers stored in said first storage means, and wherein said driving means acquires the control information corresponding to the random number values sequentially read out from the selected random number table in accordance with the correspondence set by said setting means, and drives said recording head on the basis of the acquired control information.

43. The apparatus according to claim 41, wherein said recording head comprises an ink-jet recording head for performing recording by ejecting an ink.

44. The apparatus according to claim 43, wherein said recording head comprises a recording head for ejecting the ink by utilizing heat energy, and comprises a heat energy conversion element for generating heat energy to be applied to the ink.

45. The apparatus according to claim 44, wherein said recording head causes a change in state in the ink by heat energy applied by said heat energy conversion element, and ejects the ink from an ejection orifice on the basis of the change in state.

46. The apparatus according to claim 44, wherein said second storage means stores the control information for controlling an ejection amount of the ink from recording elements of the recording head.

47. The apparatus according to claim 41, wherein a plurality of recording elements of the recording head are driven while being divided into a plurality of blocks upon recording of the image, and said driving means reads out the instruction data corresponding in number to the plurality of blocks from the selected random number table, acquires the control information corresponding to the readout instruction data, and drives the recording head while changing the driving patterns in units of blocks on the basis of the control information.

48. A method of controlling a recording apparatus for recording an image based on image data using a recording head, comprising the steps of:

storing a plurality of instruction data for instructing an execution order of a plurality of driving patterns of the recording head, the plurality of instruction data instructing different execution orders;

randomly selecting the plurality of instruction data stored in the storage step one by one upon recording of the image, said selection step selecting the plurality of instruction data independently from the image data; and driving the recording head based on the image data while sequentially changing the driving patterns of the recording head in accordance with the execution order instructed by the instruction data selected in the selection step.

49. A method of controlling a recording apparatus for recording an image based on image data using a recording head, comprising:

the first storage step of storing a plurality of instruction data for instructing an execution order of a plurality of driving patterns of the recording head, the plurality of instruction data instructing different execution orders;

the second storage step of storing order information for instructing an extraction order of the plurality of instruction data, where the extraction order is random and independent from the image data to be recorded;

the extraction step of extracting the plurality of instruction data stored in the first storage step one by one on the basis of the order information stored in the second storage step upon recording of the image; and the driving step of driving the recording head based on the image data while sequentially changing the driving patterns of the recording head in accordance with the execution order instructed by the instruction data extracted in the extraction step.

50. A method of controlling a recording apparatus for recording an image based on image data using a recording head, comprising:

the first storage step of storing instruction data each for instructing a corresponding one of a plurality of driving patterns of the recording head in an order which is random and independent from image data to be recorded;

the second storage step of storing control information corresponding to each of the plurality of driving patterns; and the driving step of sequentially reading out the instruction data stored in the first storage step to acquire the control information corresponding to the readout instruction data from the control information stored in the second storage step, and driving the recording head based on the image data while changing the driving patterns of the recording head on the basis of the acquired control information.

51. A method of controlling a recording apparatus for recording an image based on image data using a recording head, comprising:

the first storage step of storing a plurality of different tables each for storing instruction data each for instructing a corresponding one of a plurality of driving patterns of the recording head in an order which is random and independent from image data to be recorded;

the second storage step of storing control information corresponding to each of the plurality of driving patterns;

the selection step of randomly and independently of the image data selecting one of the tables stored in the first storage step upon recording of the image; and the driving step of acquiring the control information corresponding to the instruction data sequentially read out from the selected table from the control information stored in the second storage step, and driving the recording head based on the image data while changing the driving patterns of the recording head on the basis of the acquired control information.

52. A method of controlling a recording apparatus for recording an image based on image data using a recording head, comprising:

the first storage step of storing a plurality of different random number tables for storing random numbers which are generated to have different numerical value ranges, where an order of the random numbers is independent from the image data to be recorded;

the second storage step of storing control information corresponding to each of a plurality of types of driving patterns of the recording head;

the designation step of designating a change range of the driving pattern;

the selection step of selecting one of the random number tables stored in the first storage step on the basis of the change range designated in the designation step; and the driving step of acquiring one of the control information stored in the second storage step on the basis of the random numbers sequentially read out from the selected random number table and driving the recording head based on the image data while changing the driving patterns of the recording head on the basis of the acquired control information.

* * * * *

UNITED STATES PATENT AND TRADEMARK OFFICE
CERTIFICATE OF CORRECTION

PATENT NO. : 5,914,731
DATED : June 22, 1999
INVENTOR(S) : KENTARO YANO, ET AL.

It is certified that error appears in the above-identified patent and that said Letters Patent is hereby corrected as shown below:

COLUMN 2

Line 17, "nozzles" (first occurrence) should be deleted.

COLUMN 16

Line 11, "to" (second occurrence) should be deleted.

COLUMN 24

Line 55, "plurality" should read --plurality of--.

COLUMN 27

Line 29, "form" should read --from--.

Signed and Sealed this

Thirteenth Day of June, 2000

Attest:

Q. TODD DICKINSON

*Attesting Officer*     *Director of Patents and Trademarks*